(12) United States Patent
Kuchi

(10) Patent No.: US 11,824,629 B2
(45) Date of Patent: Nov. 21, 2023

(54) METHOD AND A SYSTEM FOR TRANSMITTING DFT-S-OFDM SYMBOLS

(71) Applicant: WISIG NETWORKS PRIVATE LIMITED, Telangana (IN)

(72) Inventor: Kiran Kumar Kuchi, Hyderabad (IN)

(73) Assignee: WISIG NETWORKS PRIVATE LIMITED

( * ) Notice: Subject to any disclaimer, the term of this patent is extended or adjusted under 35 U.S.C. 154(b) by 5 days.

(21) Appl. No.: 17/739,724

(22) Filed: May 9, 2022

(65) Prior Publication Data

US 2022/0337369 A1 Oct. 20, 2022

Related U.S. Application Data

(63) Continuation of application No. 16/990,402, filed on Aug. 11, 2020, now Pat. No. 11,343,047, which is a
(Continued)

(30) Foreign Application Priority Data

Dec. 2, 2016 (IN) .............................. 201641041195
Jan. 20, 2017 (IN) .............................. 201741002328
(Continued)

(51) Int. Cl.
*H04J 13/00* (2011.01)
*H04J 11/00* (2006.01)
(Continued)

(52) U.S. Cl.
CPC ......... *H04J 13/004* (2013.01); *H04J 11/0033* (2013.01); *H04L 5/0051* (2013.01);
(Continued)

(58) Field of Classification Search
CPC ................ H04J 13/004; H04J 11/0033; H04J 2011/0013; H04J 11/00; H04L 5/0051;
(Continued)

(56) References Cited

U.S. PATENT DOCUMENTS

2008/0279170 A1 11/2008 Maladi
2010/0074244 A1 3/2010 Luo
(Continued)

OTHER PUBLICATIONS

Int'l Search Report and Written Opinion Appln No. PCT/IN2017/050565 dated Jul. 3, 2018.
(Continued)

*Primary Examiner* — Kyaw Z Soe
(74) *Attorney, Agent, or Firm* — McAndrews, Held & Malloy, Ltd.

(57) ABSTRACT

The present disclosure discloses a method and a system for transmitting DFT-s-OFDM symbols. A data sequence for transmitting as an OFDM symbol is received as input from a data source. A reference sequence for transmitting along with the data sequence as the OFDM symbol is generated and time-multiplexed with the data sequence, to generate a multiplexed sequence. Thereafter, a Discrete Fourier Transform (DFT) operation is performed on the multiplexed sequence to generate a DFT-spread-Orthogonal Frequency Division Multiplexing (DFT-s-OFDM) symbol that is further processed for transmitting over a channel. The transmission of the reference sequence and the data sequence in a single OFDM symbol provides better bandwidth utilization and flexibility in modulation of the reference sequence and the data sequence.

72 Claims, 13 Drawing Sheets

Related U.S. Application Data continuation of application No. 16/465,940, filed as application No. PCT/IN2017/050565 on Dec. 2, 2017, now Pat. No. 10,958,395.

(30) Foreign Application Priority Data

Jan. 21, 2017 (IN) .............................. 201741002403
Jan. 25, 2017 (IN) .............................. 201741002803

(51) Int. Cl.
*H04L 5/00* (2006.01)
*H04L 27/26* (2006.01)
*H04W 72/541* (2023.01)

(52) U.S. Cl.
CPC ........ *H04L 27/265* (2013.01); *H04L 27/2626* (2013.01); *H04L 27/26526* (2021.01); *H04W 72/541* (2023.01); *H04J 2011/0013* (2013.01); *H04L 5/0048* (2013.01)

(58) Field of Classification Search
CPC ............... H04L 27/2626; H04L 27/265; H04L 27/26526; H04L 5/0048; H04L 5/0007; H04W 72/541
See application file for complete search history.

(56) References Cited

U.S. PATENT DOCUMENTS

| | | |
|---|---|---|
| 2010/0111209 A1 | 5/2010 | Frenger |
| 2014/0003544 A1 | 1/2014 | Oketani |
| 2014/0254530 A1 | 9/2014 | Kim |
| 2016/0112994 A1 | 4/2016 | Wang |
| 2017/0134203 A1* | 5/2017 | Zhu ........................ H04L 27/362 |
| 2018/0062894 A1* | 3/2018 | Ma ........................ H04L 5/0007 |
| 2019/0097859 A1* | 3/2019 | Bala .................. H04L 27/26132 |
| 2020/0076558 A1* | 3/2020 | Kuchi ............... H04L 27/26526 |

OTHER PUBLICATIONS

K. Kuchi, "Partial Response DFT-precoded-OFDM Modulation," IEEE Trans. on Emerging Tele. Tech., May 2012.

Khan, "LTE for 4G Mobile Broadband Air Interface Technologies and Performance." New York, NY: Cambridge University Press, 2009.

Iith et al., "Comparison of pi/2 BPSK with and without frequency domain pulse shaping: Results with PA model," 3GPP TSG-RAN WG1 Ad-Hoc NR Meeting, R1-1701180, Spokane, WA, USA, Jan. 16-20, 2017.

* cited by examiner

METHOD AND A SYSTEM FOR TRANSMITTING DFT-S-OFDM SYMBOLS

The present application is a continuation of U.S. patent application Ser. No. 16/990,402, filed Aug. 11, 2020 (now U.S. Pat. No. 11,343,047), which is a continuation of U.S. patent application Ser. No. 16/465,940, filed May 31, 2019 (now U.S. Pat. No. 10,958,395), which is a 371 of PCT/IN2017/050565 filed Dec. 2, 2017. These documents are all hereby incorporated by reference in their entirety.

TECHNICAL FIELD

Embodiments of the present disclosure are related, in general to field of communication. Specifically, but not exclusively, the present disclosure relates to time multiplexing data and pilots to form a DFT-s-OFDM symbol and transmitting DFT-S-OFDM symbols.

BACKGROUND

Orthogonal Frequency Division Multiplexing (OFDM) is widely used in telecommunication and Wireless Fidelity (Wi-Fi) systems. OFDM allows resourceful utilization of a bandwidth. OFDM involves creating sub-carriers from a wideband carrier. Each sub-carrier is an orthogonal frequency, and each sub-carrier carriers a sequence of data. The procedure of mapping data sequence to sub-carriers is known as sub-carrier mapping. The use of orthogonal frequencies helps in reducing guard bands, thus utilizing the bandwidth completely. However, OFDM use multiple sub-carriers, using OFDM for uplink leads to high Peak Power to Average Ratio (PAPR).

Long Term Evolution (LTE) and LTE extended systems uses OFDM and Discrete Fourier Transform (DFT) spread OFDM (DFT-s-OFDM) for transmitting data DFT-s-OFDM allows faster transmission, and thus higher data rate is achieved. The DFT-s-OFDM is essentially a single carrier modulation scheme. DFT-s-OFDM has lower PAPR compared to OFDM. Furthermore, DFT-s-OFDM has similar robustness to the frequency selective fading as OFDM as cyclic prefix is introduced to reduce Inter Symbol Interference (ISI).

A DFT-s-OFDM symbol comprises a data sequence and a pilot sequence (reference sequence). The reference sequence is necessary for enabling channel equalization. In the existing communication systems, the data sequence and the reference sequence are time multiplexed and are sent as independent symbols, i.e., at one slot data sequence is transmitted and at another slot, the reference sequence is transmitted.

FIG. 1A shows uplink control channelization in short Uplink (UL) duration. The short UL duration comprises two short-symbols, with half of the data symbol duration in time, at the end of a slot. The Demodulation Reference Signals (DMRS) and User Control Information (UCI) are assumed to be time division multiplexed (TDM) in time domain, where the DMRS is transmitted in the first half-symbol, while the UCI is transmitted in the second half symbol.

It is known that, for a millimeter (mm) wave numerology with very short symbol length, the symbol length of a short UL burst may not be split further. The short UL burst may contain two symbols of same numerology as data. The data is dependent on numerology, and can be configured by a network semi-statically. For multiplexing Physical Uplink Control Channel (PUCCH) with PUSCH in the short UL duration, "time critical" UL payload data for users with good link budget in downlink-centric slot has to be transmitted, so that the users do not have to wait for the UL-centric slot. The PUCCH and Physical Uplink Shared Channel (PUSCH) are transmitted by different users, which are Frequency Division Multiplexed (FDM). When PUCCH and PUSCH are transmitted by a same user simultaneously, there may be two different options, similar as the options to multiplex simultaneous PUCCH with PUSCH in long UL duration. Preferably, this could unify the design of short and long UL duration as much as possible. In first option, PUCCH is transmitted in adjacent Resource Blocks (RBs) with PUSCH, as shown in FIG. 1B. FIG. 1B shows that the PUCCH is being transmitted in adjacent RBs with PUSCH.

In the second option, the PUCCH is multiplexed before DFT with PUSCH and is carried inside PUSCH, as shown in FIG. 1C. FIG. 1C shows an illustration of Piggyback PUCCH in PUSCH. In multiplex PUCCH with SRS in short UL duration, to support SRS transmission in Short UL duration as the long UL duration may not be available in each slot. Further, periodicity of Sounding Reference Signals (SRS) sounding, and periodicity of the long UL bursts are determined by different factors, respectively. It is not preferred to restrict the SRS transmission only within the long UL duration. Therefore, it is necessary that the network should configure SRS to be transmitted in either the long UL duration or short UL duration.

FIG. 2 illustrates a PUCCH structure type in a short UL duration, which shows an option to multiplex SRS with other control/data channels in the short UL burst. The SRS is transmitted in a reserved sub-band, e.g., top half of the whole system bandwidth, while DMRS and PUCCH are transmitted in the rest of the system bandwidth. The "SRS sub-band" can be swept across different slots. As shown in FIG. 2, in the next slot, the "SRS sub-band" is shifted to the lower half of the whole system bandwidth, to complete the sweeping of the whole bandwidth sounding. However, when the SRS and the PUCCH are configured to transmit simultaneously in a short UL duration from the same UE, the inter-mod (e.g. IMD3) may be an issue, due to the potential non-contiguous tone assignment. There are two approaches to reduce the intermodulation. From e-node B (eNB) perspective, it should schedule SRS and PUCCH on adjacent tones whenever it is possible. From User Equipment (UE) perspective, UE may drop SRS in current slot and delay SRS to later slot, if the intermodulation is too large to handle.

FIG. 3 shows an illustration of PUCCH structure types in short UL duration. The ACK/NACK decoding performance is tested with three different PUCCH structure types, as shown in FIG. 3. Type 0 is a wideband distributed PUCCH, which has good frequency diversity but suffers with high PAPR and large out of band emission due to intermodulation distortion. Type 1 is a localized PCCH, which can apply DFT-S-OFDM to maintain single carrier which has low PAPR. The location of the localized PUCCH tones can be either static or dynamically scheduled by eNB. The dynamically scheduled by eNB can explore the frequency selective scheduling gain. Type 2 is a narrow band distributed PUCCH, which is a hybrid version of type 0 and type 1. When compared with type 0, Type 2 has smaller intermodulation distortion but less frequency diversity. Also, when compared with Type 1, Type 2 has larger intermodulation distortion and higher PAPR. One of the other challenges in mm wave systems is the phase noise caused by oscillators operating at high carrier frequencies.

In mm wave systems there is a need to track the phase variation caused by Oscillator drift within on OFDM symbol. When uplink transmitter employs DFT-S-OFDM there is needs to a provision for enabling phase tracking within one OFDM symbol.

Also in systems where the user moves at high velocities such as in high speed trains the propagation channel varies fast in time causing rapid variations in magnitude/phase of the channels. In such cases there needs to be a mechanism to enable channel magnitude/phase tracking. The waveform should also be constructed such that the overall signal has low peak-to-average ratio (PAPR) and enables operation of the power amplifier (PA) efficiency with low back-off.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure discloses a method for transmitting Orthogonal Frequency Division Multiplexing (OFDM) symbols. The method comprises receiving a data sequence for transmitting as an OFDM symbol. The method further comprises generating a reference sequence for transmitting along with the data sequence. Further, the reference sequence and the data sequence are time-multiplexed to generate a multiplexed sequence. The time-multiplexing is performed such that the data sequence and the reference sequence are part of a single OFDM symbol. Thereafter, the method comprises performing a Discrete Fourier Transform (DFT) on the multiplexed sequence to generate a DFT-spread-Orthogonal Frequency Division Multiplexing (DFT-s-OFDM) symbol. The method enables a low PAPR waveform transmission. Lastly, the method comprises processing the DFT-s-OFDM symbol for transmitting over a channel.

In an embodiment, the present disclosure discloses a transmitter for transmitting Orthogonal Frequency Division Multiplexing (OFDM) symbols. The transmitter comprises a reference sequence generator, a time-multiplexer, a Discrete Fourier Transform (DFT) spread unit and a post-processor. The reference sequence generator generates a reference sequence. The, time-multiplexer receives a data sequence and the reference sequence for transmitting as the OFDM symbol. Further, the time-mulitplexer time-multiplexes the reference sequence with the data sequence, to generate a multiplexed sequence. Thereafter, the DFT spread unit performs a DFT on the multiplexed sequence to generate a DFT-spread-Orthogonal Frequency Division Multiplexing (DFT-s-OFDM) symbol. Lastly, the post-processor processes the DFT-s-OFDM symbol for transmitting over a channel.

In an embodiment, the present disclosure discloses a method for receiving OFDM signals. The method comprises receiving an analog time-multiplexed signal. Further, the method comprises converting the analog time-multiplexed signal into a corresponding digital time-multiplexed signal. Furthermore, the method comprises performing a Fast Fourier Transform (FFT) on the digital time-multiplexed signal to produce a frequency domain time-multiplexed signal. Thereafter, the method comprises mapping the time-multiplexed signal to one or more sub-carriers for generating a mapped signal. Subsequently the method comprises performing Inverse Discrete Fourier Transform (IDFT) on the mapped signal and lastly the method comprises demultiplexing the mapped signal to isolate at least one reference sequence from at least one data sequence. The demultiplexed at least one reference sequence will be used for channel magnitude or phase tracking.

In an embodiment, the present disclosure discloses a receiver for receiving OFDM signals. The receiver comprises an Analog to Digital Converter (ADC), a Fast Fourier Transform (FFT) unit, a carrier mapping unit, an Inverse Discrete Fourier Transform (IDFT) unit and a de-multiplexer. The ADC is configured to receive an analog time-multiplexed signal. The ADC then converts the analog time-multiplexed signal into a corresponding digital time-multiplexed signal. Further, the FFT unit performs the FFT on the digital time-multiplexed signal to produce a frequency domain time-muitiplexed signal. Further, the carrier mapping unit maps the time-multiplexed signal to one or more sub-carriers for generating a mapped signal. Thereafter, the IDFT unit performs Inverse Discrete Fourier Transform (IDFT) on the mapped signal. Lastly, the de-multiplexer demultiplexing the mapped signal to isolate at least one reference sequence from at least one data sequence. The demultiplexed at least one reference sequence will be used for channel magnitude or phase tracking.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1A:
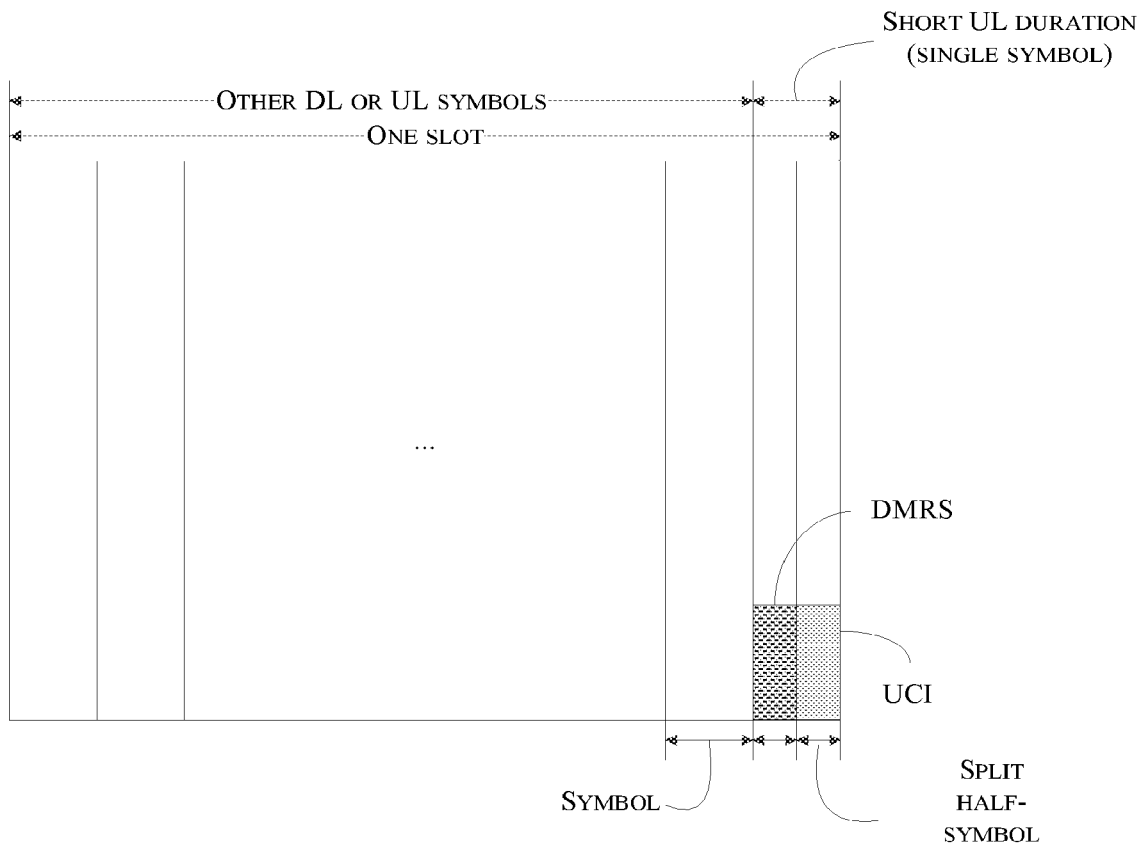
FIG. 1A, FIG. 1B and FIG. 1C illustrates an OFDM symbol frame of a conventional communication system where data sequence and reference sequence are time multiplexed and are transmitted at dedicated slots.
Figure 1B:
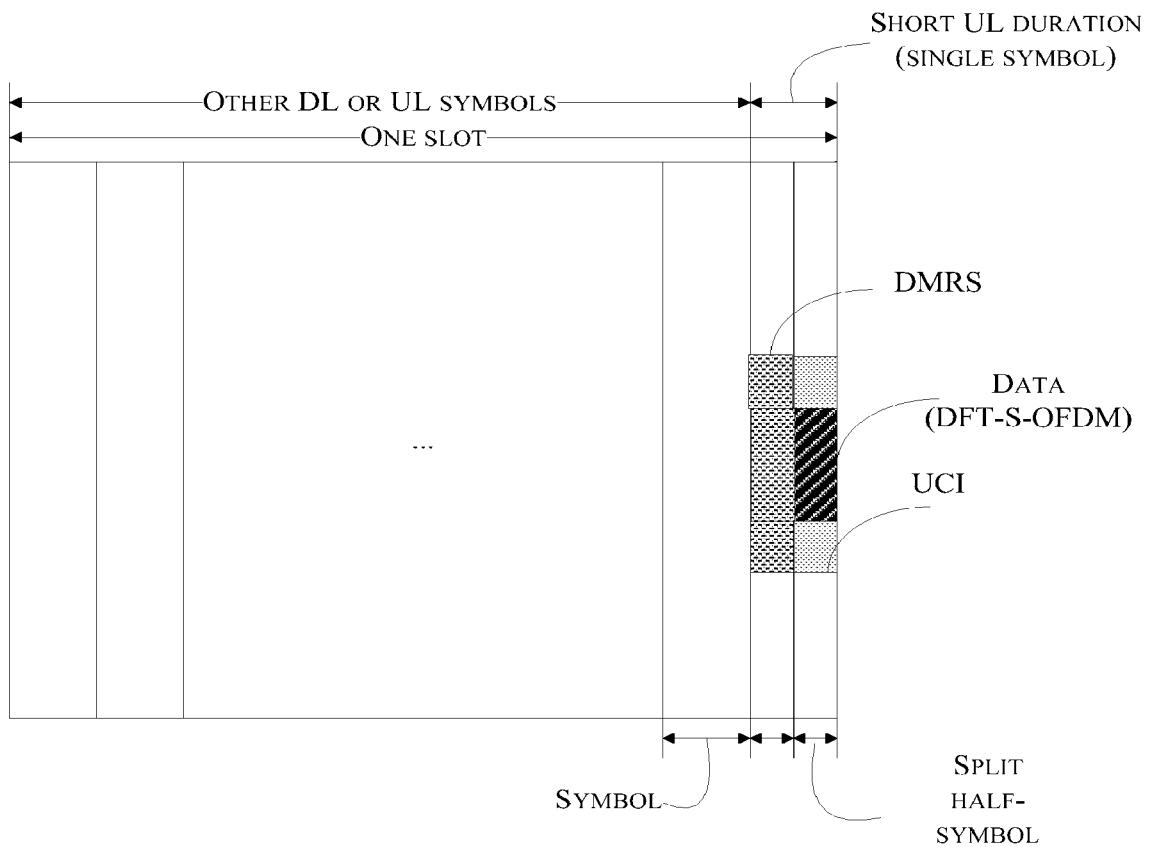
Figure 1C:
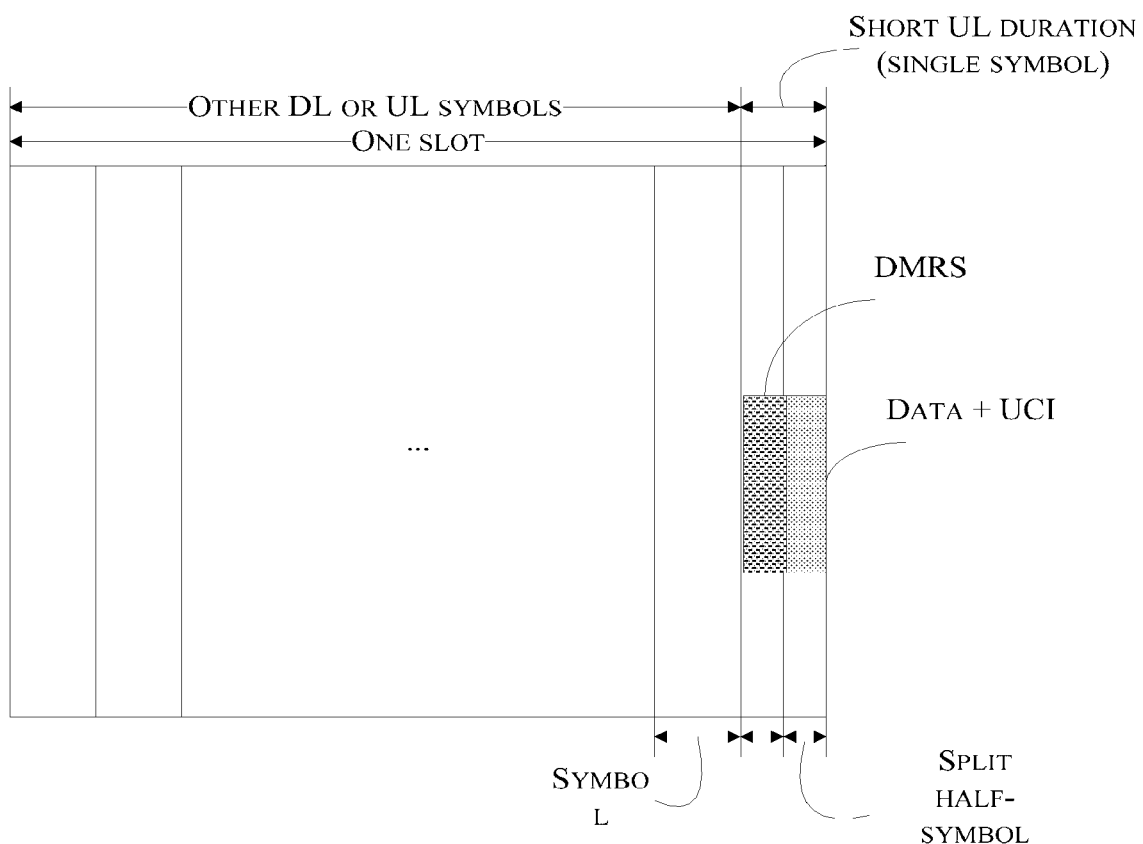

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to a method and a system for transmitting Orthogonal Frequency Division Multiplexing (OFDM) symbols. A data sequence and a reference sequence are time multiplexed. Further, a Discrete Fourier Transform is performed such that, the time multiplexed data and reference symbols are in a single slot of a the OFDM symbol. The symbol where the data and the reference sequence are in a single slot may be referred as DFT-spread-OFDM (DFT-s-OFDM) symbol. The multiplexing of data sequence and the reference sequence in a single slot of the DFT-s-OFDM symbol provides flexibility in transmitting the DFT-s-OFDM symbol. That is, the data sequence and the reference sequence may be multiplexed at any slot in the DFT-s-OFDM symbol, unlike multiplexing in dedicated slots in the conventional systems. The transmission of the reference sequence and the data sequence in a single OFDM symbol provides better bandwidth utilization and flexibility in modulation of the reference sequence and the data sequence. Furthermore, such multiplexing allows the receiver track channel magnitude and/or phase variations across time. This is especially useful in systems that have high Doppler caused by higher mobile speed such as high-speed trains/cars or in systems employing high carrier frequency where the crystal oscillator exhibits frequency/phase variations within one OFDM symbol.

Figure 2:
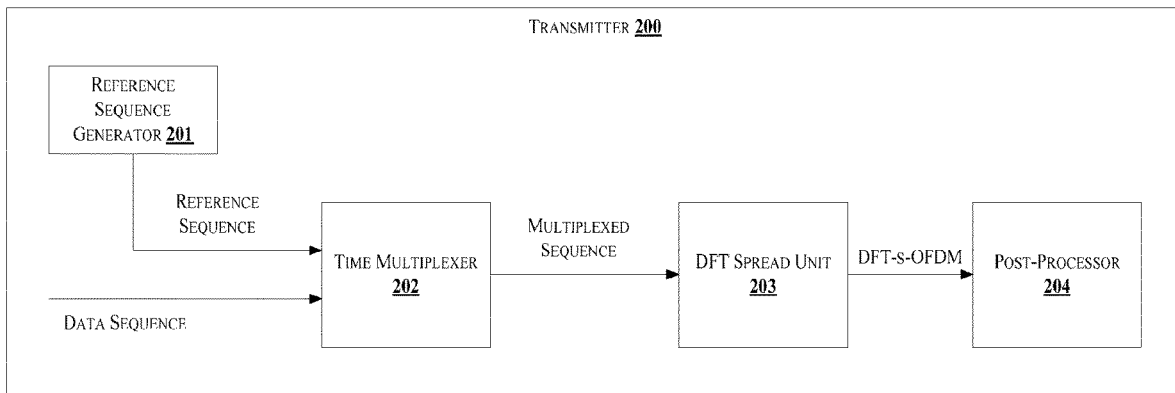
FIG. 2 shows an exemplary block diagram illustration of a transmitter for transmitting a DFT-s-OFDM symbol, in accordance with some embodiments of the present disclosure.

FIG. 2 discloses an exemplary block diagram of a transmitter 200. The transmitter 200 is configured to generate and transmit at least one DFT-s-OFDM symbol. The transmitter 200 may comprise a reference sequence generator 201, a time multiplexer 302, a DFT spread unit 203, and a post-processor 204. The reference sequence generator 201 generates a reference sequence. The transmitter 200 receives a data sequence from a data source. In one aspect, the transmitter 200 may be configured in a User Equipment (UE) for an uplink transmission. In another aspect, the transmitter 200 may be configured in a base station to transmit data sequence to the UE.

The reference sequence is used for channel estimation. During uplink transmission, the reference sequence is added to the data sequence generating a time multiplexed signal. The time multiplexed signal is then transmitted to the base station. A eNode-B at the base station receives the data along with the reference sequence and estimates the channel properties based on information encoded in the reference sequence. The reference sequence may be at least one of Demodulation Reference Signal (DMRS) or a phase tracking reference signal. The DMRS is used to enable coherent signal demodulation at the eNode-B. In another example, the reference sequence may be used to track phase variations within one OFDM and may be called phase-tracking reference signal (PT-RS).

During downlink, the reference sequence is added to the data sequence to allow the UE for coherent demodulation. The UE may interpolate over multiple reference sequence to estimate the channel.

The time multiplexer 202 receives the data sequence and the reference sequence and time multiplexes the data and the reference sequence to generate a multiplexed sequence. Further the multiplexed sequence is provided to a DFT spread unit 203. The DFT spread unit 203 performs DFT on the multiplexed signal. Mere, the DFT spread unit 203 may perform a N-point DFT on modulated multiplexed data and reference sequence to frequency domain. Further, output of the DFT spread unit 203 is mapped to the orthogonal sub-carriers, thus forming a DFT-spread-OFDM (DFT-s-OFDM) symbol. The DFT-s-OFDM enables the data sequence and the reference sequence to be multiplexed in a single slot of the DFT-s-ODFM symbol. Thus, the data sequence and the reference sequence can be transmitted in a single DFT-s-OFDM symbol. Farther, the DFT-s-OFDM symbol is provided to a post-processor 204 for processing the DFT-s-OFDM before the transmission.

Figure 3:
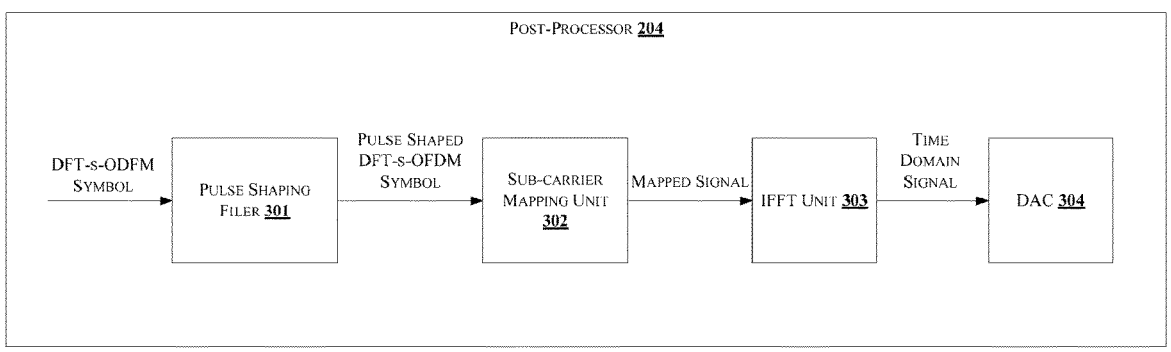
FIG. 3 is an illustrative of a first variant of a post-processor of a transmitter for transmitting a DFT-s-OFDM symbol, in accordance with some embodiments of the present disclosure.

FIG. 3 shows a first configuration of the post-processor 204. In one embodiment, the post-processor 204 may comprise a shaping filter 301, a sub-carrier mapping unit 302, Inverse Fast Fourier Transform (IFFT) unit 303 and a Digital to Analog Converter (DAC) 304. The shaping filter 301 is used to improve time-frequency distortions of the OFDM sub-carriers. Improvement in time-frequency distortions provides better spectral containment, thereby enabling a reduction in peak-to-average-power-ratio (PAPR). In an embodiment, the shaping filter 301 performs the shaping in frequency domain without bandwidth expansion i.e., shaping is done over the DFT output without adding additional subcarriers. In another embodiment, the shaping is performed in time domain. The time domain shaping can be performed as a circular convolution operation before the DFT. The output of the shaping filter 301 is a pulse shaped DFT-s-OFDM symbol. The pulse shaped DFT-s-OFDM symbol is then provided to the sub-carrier mapping unit 302. The sub-carrier mapping unit 302 maps the pulse shaped DFT-s-OFDM symbol to orthogonal sub-carriers of the DFT-s-OFDM symbol. Output of the sub-carrier mapping unit 302 is denoted as a mapped signal. Further, the mapped signal is provided to the IFFT unit 303. The IFFT unit 303 performs IFFT on the mapped signal for generating a time domain signal from the frequency domain signal. Thereafter, the DAC 204 converts the time domain signal into corresponding analog signals for transmitting.

Figure 4:
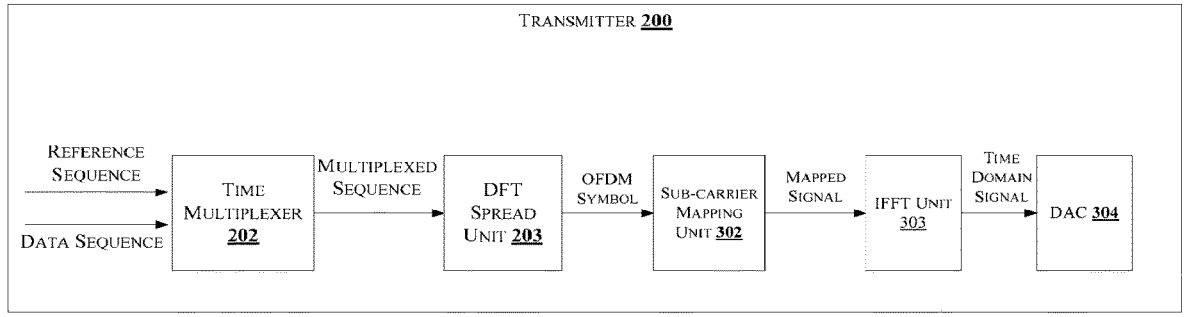
FIG. 4 shows a block diagram illustrating of a transmitter for transmitting a waveform by multiplexing data and pilots in an OFDM symbol using discrete Fourier transform (DFT)-spread-OFDM (DFT-S-OFDM), in accordance with an embodiment of the present disclosure.

FIG. 4 shows a block diagram illustrating a transmitter 200 for transmitting a waveform by multiplexing data and pilots in an OFDM symbol using discrete Fourier transform (DFT)-spread-OFDM (DFT-S-OFDM), in accordance with an embodiment of the present disclosure. The transmitter 200 is also referred as a communication system or transmitter system.

As shown in FIG. 4, the transmitter 200 includes a processor and a memory (not shown in FIG. 4). The memory may be communicatively coupled to the processor. The processor may be configured to perform one or more functions of the transmitter 200 for generating and transmitting data or waveform. In one implementation, the transmitter 200 may comprise modules for performing various operations in accordance with the embodiments of the present disclosure. The transmitter 200 is configured to multiplex data and pilot wherein the data may be control information. The transmitter 200 includes at least one transceiver (not shown in FIG. 4) to perform receiving an input data from a transmitter, and transmitting a generated waveform to a destination.

The modules of the transmitter include the time multiplexer 202, the Discrete Fourier Transform (DFT) spread unit 203, a subcarrier mapping unit 302, an Inverse Fast Fourier Transform (IFFT) unit 303 and a DAC 304. The DFT spread unit 203 is also referred as FFT module. The IFFT unit 303 is also referred as inverse DFT module.

The time multiplexer 202 is configured to perform time multiplexing of plurality of data, which includes pilots and data, in one Orthogonal Frequency Division Multiplexing (OFDM) symbol to generate time multiplexed data. The pilot may be pi/2 Binary Phase Shift Keying (BPSK) sequences, in one embodiment. The time multiplexed data is transmitted using DFT-s-OFDM without frequency domain pulse shaping still obtained a low PAPR waveform. The time multiplexed data is fed to the DFT module 303 to performed discrete Fourier Transform to generate a DFT multiplexed data.

The subcarrier mapping module 302 performs subcarrier mapping on the DFT multiplexed data to generate mapped DFT multiplexed data. The IFFT module 303 performs an inverse transform of the mapped DFT multiplexed data to generate a time domain signal. An output module (not shown in the FIG. 4) performs at least one of addition of cyclic prefix, cyclic suffix, windowing, windowing with overlap and adding operation (WOLA) and filtering of the time domain signal to generate output sequence. The data may be one of pi/2 BPSK and QPSK. The output sequence may be fed to the digital to analog converter (DAC) 304 to generate an analog waveform, which is transmitted to a destination.

Figure 5:
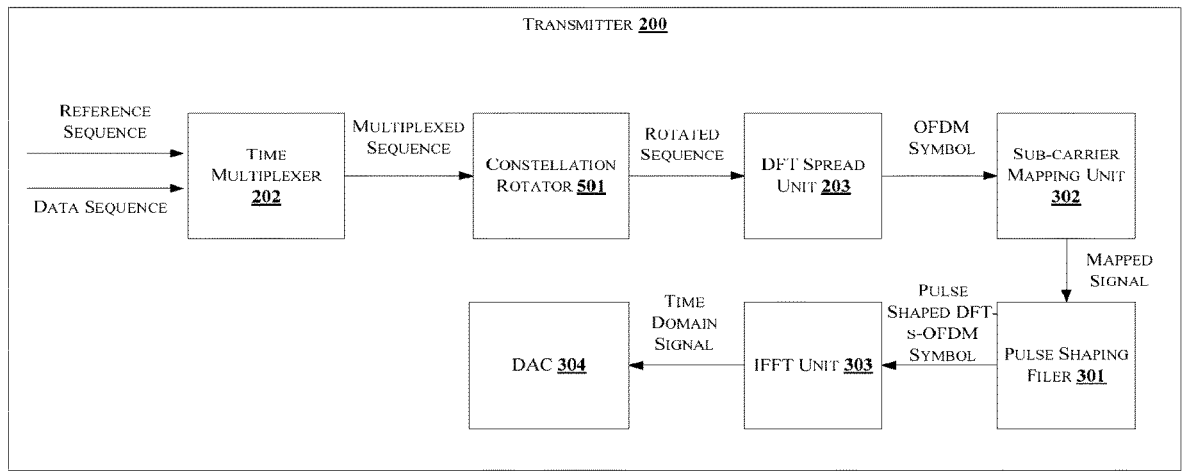
FIG. 5 shows a block diagram illustrating of a transmitter for transmitting a waveform by multiplexing data and pilots in an OFDM symbol using Discrete Fourier Transform (DFT)-spread-OFDM (DFT-S-OFDM), in accordance with another embodiment of the present disclosure.

FIG. 5 shows a block diagram illustrating of a transmitter 200 for transmitting a waveform by multiplexing data and pilots in an OFDM symbol using discrete Fourier transform (DFT)-spread-OFDM (DFT-S-OFDM), in accordance with another embodiment of the present disclosure.

The transmitter 200 as shown in FIG. 5, may include the time multiplexer 202, a constellation rotator 501, the DFT spread unit 203, the subcarrier mapping unit 302, a frequency domain pulse shaping filter 301, the IFFT unit 303 and the DAC 304. The inverse FFT module 303 is also referred as inverse DFT module.

The time multiplexer 202 is configured to perform time multiplexing of plurality of data, which includes pilots and data, in one Orthogonal Frequency Division Multiplexing (OFDM) symbol to generate time multiplexed data. The time multiplex data is transmitted using DFT-s-OFDM without frequency domain pulse shaping.

The constellation rotator 501 is configured to perform constellation rotation on the time multiplexed data to generate rotated data. The DFT spread unit 203 and the sub-carrier mapping unit 302 performs a DFT spreading and subcarrier mapping on the rotated data to generate mapped data. The frequency domain pulse shaping filter 301, performs the frequency domain pulse shaping on the mapped data to generate filtered data without bandwidth expansion.

The IFFT unit 303 performs an inverse transform of the filtered data to generate a time domain signal. The output module (not shown in FIG. 5), performs at least one of addition of cyclic prefix, cyclic suffix, windowing, windowing with overlap and adding operation (WOLA) and filtering of the time domain signal to generate output sequence. The output sequence may be fed to the DAC 304 to generate an analog waveform, which is transmitted to a destination.

Figure 6:
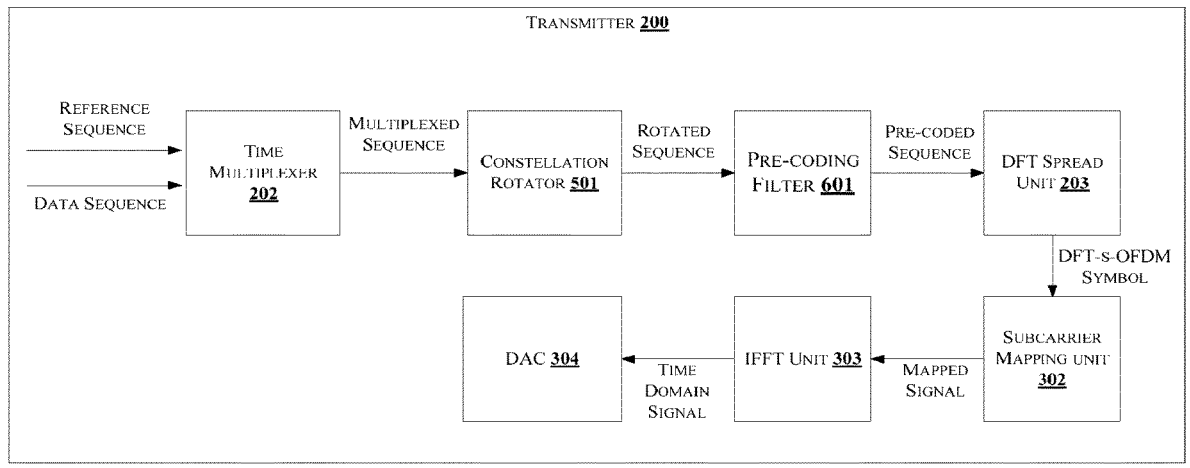
FIG. 6 shows a block diagram illustrating of a transmitter for transmitting a waveform by multiplexing data and pilots in an OFDM symbol using discrete Fourier transform (DFT)-spread-OFDM (DFT-S-OFDM), in accordance with another embodiment of the present disclosure.

FIG. 6 shows a block diagram illustrating of a transmitter for transmitting a waveform by multiplexing data and pilots in an OFDM symbol using discrete Fourier transform (DFT)-spread-OFDM (DFT-S-OFDM), in accordance with another embodiment of the present disclosure.

The transmitter 200 may include the time multiplexer 202, the constellation rotator 501, a data precoding using Q-tap filter 601 where length of Q is less than or equal to length of multiplexed data and pilot sequence, DFT spread unit 203, the subcarrier mapping unit 302, the IFFT unit 303 and the DAC 304.

The time multiplexer 202 is configured to perform time multiplexing of plurality of data, which includes pilots and data, in one Orthogonal Frequency Division Multiplexing (OFDM) symbol to generate time multiplexed data. The time multiplex data is transmitted using DFT-s-OFDM with time domain precoding.

The constellation rotator 501 is configured to perform constellation rotation on the time multiplexed data to generate rotated data. The data precoding using Q-tap filter 601 performs a precoding operation that uses a polynomial precoder on the rotated data to generate a filtered data. The value of Q may be 1, 2, 3 etc. The precoding of the data and the pilots may be performed separately, in one embodiment. The DFT spread unit 203 and subcarrier mapping unit 302 performs a DFT spreading and subcarrier mapping is performed on the filtered data to generate a mapped filtered data.

The IFFT module 303 performs an inverse transform of the mapped filtered data to generate a time domain signal. The output module (not shown in figure) performs at least one of addition of cyclic prefix, cyclic suffix, windowing, windowing with overlap and adding operation (WOLA) and filtering of the time domain signal to generate output sequence. The output sequence may be fed to the DAC 304 to generate an analog waveform, which is transmitted to a destination.

Figure 7:
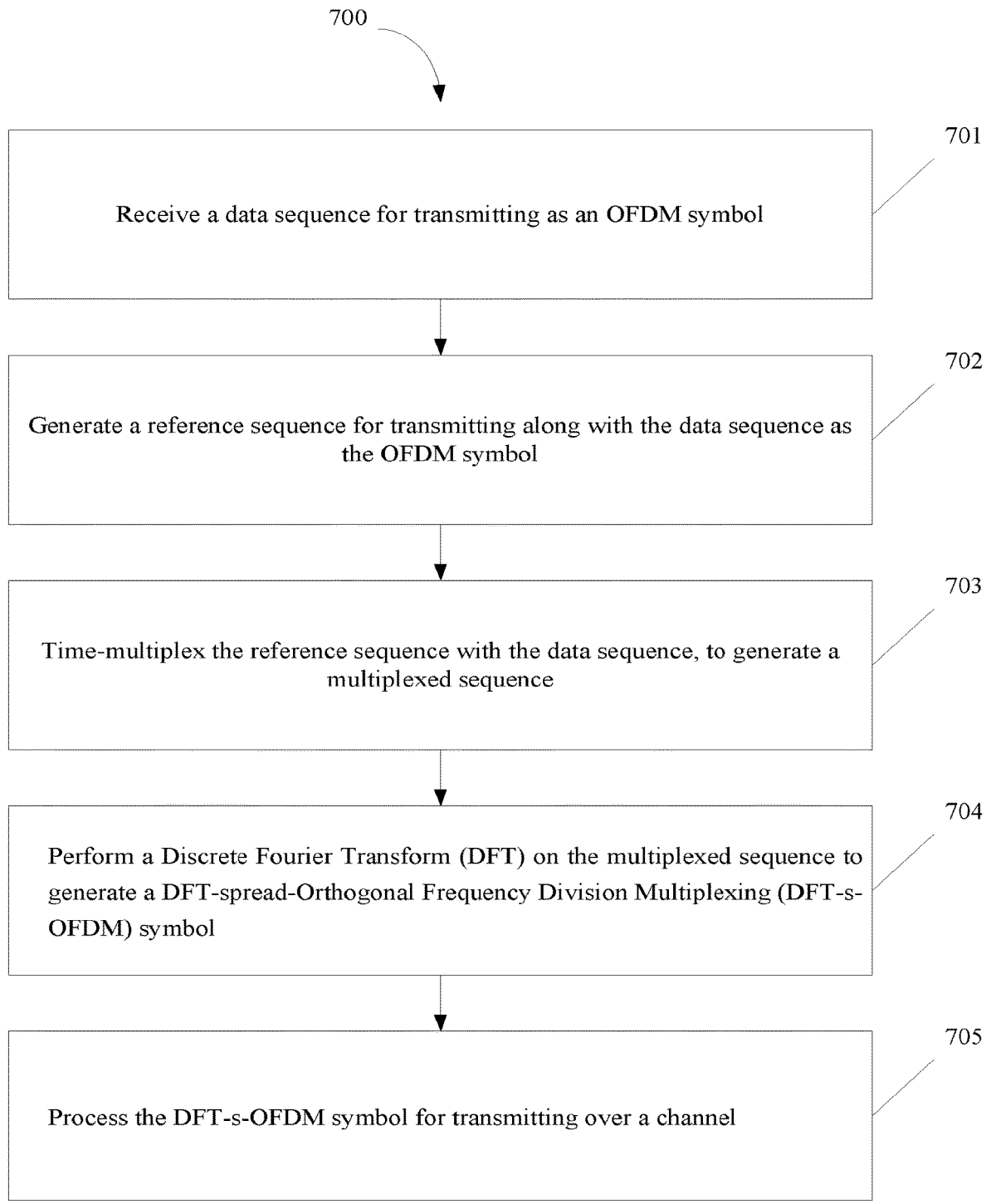
FIG. 7 shows an exemplary flow chart illustrating method steps for transmitting a waveform by multiplexing data and pilots in an OFDM symbol using Discrete Fourier Transform (DFT)-spread-OFDM (DFT-s-OFDM), in accordance with some embodiments of the present disclosure.

FIG. 7 shows a flow chart illustrating a method for transmitting a waveform by multiplexing data and pilots in an OFDM symbol using discrete Fourier transform (DFT)-spread-OFDM (DFT-S-OFDM), in accordance with some embodiments of the present disclosure.

As illustrated in FIG. 7, the method 700 may comprise one or more steps for transmitting DFT-s-OFDM symbols, in accordance with some embodiments of the present disclosure.

The method 700 may be described in the general context of computer executable instructions. Generally, computer executable instructions can include routines, programs, objects, components, data structures, procedures, modules, and functions, which perform particular functions or implement particular abstract data types.

The order in which the method 700 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step 701, the data sequence is received. The data sequence to be transmitted as a single OFDM symbol is received. The data sequence may be received by a data source. For example, the data sequence may be received from a remote server, a mobile device, a laptop, a Personal Digital Assistant (PDA), or any other computing device.

At step 702, the reference sequence is generated for transmitting along with the data sequence. The reference sequence generator 201 generates the reference sequence based on one or more properties related to transmission of the OFDM symbol. In one embodiment, the one or more properties may be related to channel properties.

At step 703, the data sequences are time-multiplexed with the reference sequences to generate the multiplexed sequence.

At step 704, the DFT operation is performed on the multiplexed sequence. The output of the DFT spread unit 203 is a DFT-s-OFDM symbol.

At step 705, the DFT-s-OFDM symbol is processed before transmitting.

In one embodiment, the reference sequence and the data sequence are time multiplexed and the multiplexed signal is transmitted. In an embodiment, the post-processor 204 may also perform at least one of addition of cyclic prefix, cyclic suffix, windowing, windowing with overlap and adding operation (WOLA) and filtering of the time domain signal to generate the DFT-s-OFDM symbol. In an embodiment, the transmitter 200 may use at least one of windowing, windowing with overlap-add, filtering across multiple OFDM symbols operations.

In an embodiment, the time multiplexer 202 is configured to perform time multiplexing of plurality of data, which includes pilots and data, in one Orthogonal Frequency Division Multiplexing (OFDM) symbol to generate time multiplexed data. The pilot may be pi/2 Binary Phase Shift Keying (BPSK) sequences, in one embodiment. The time multiplexed data is transmitted using DFT-s-OFDM without frequency domain pulse shaping. The time multiplexed data is fed to the DFT module 303 to performed discrete Fourier Transform to generate a DFT multiplexed data. The subcarrier mapping module 302 performs subcarrier mapping on the DFT multiplexed data to generate mapped DFT multiplexed data. The IFFT module 303 performs an inverse transform of the mapped DFT multiplexed data to generate a time domain signal. An output module (not shown in the FIG. 4) performs at least one of addition of cyclic prefix, cyclic suffix, windowing, windowing with overlap and adding operation (WOLA) and filtering of the time domain signal to generate output sequence. The data may be one of pi/2 BPSK and QPSK. The output sequence may be fed to the digital to analog converter (DAC) 304 to generate an analog waveform, which is transmitted to a destination.

In an embodiment, the time multiplexer 202 is configured to perform time multiplexing of plurality of data, which includes pilots and data, in one Orthogonal Frequency Division Multiplexing (OFDM) symbol to generate time multiplexed data. The time multiplex data is transmitted using DFT-s-OFDM without frequency domain pulse shaping. The constellation rotator 501 is configured to perform constellation rotation on the time multiplexed data to generate rotated data. The DFT spread unit 203 and the subcarrier mapping unit 302 performs a DFT spreading and subcarrier mapping on the rotated data to generate mapped data. The frequency domain pulse shaping filter 301, performs the frequency domain pulse shaping on the mapped data to generate filtered data without bandwidth expansion. The IFFT unit 303 performs an inverse transform of the filtered data to generate a time domain signal. The output module performs at least one of addition of cyclic prefix, cyclic suffix, windowing, windowing with overlap and adding operation (WOLA) and filtering of the time domain signal to generate output sequence. The output sequence may be fed to the DAC 304 to generate an analog waveform, which is transmitted to a destination.

In an embodiment, the time multiplexer 202 is configured to perform time multiplexing of plurality of data, which includes pilots and data, in one Orthogonal Frequency Division Multiplexing (OFDM) symbol to generate time multiplexed data. The time multiplex data is transmitted using DFT-s-OFDM with time domain precoding. The constellation rotator 501 is configured to perform constellation rotation on the time multiplexed data to generate rotated data. The data precoding using Q-tap filter 601 performs a precoding operation that uses a polynomial precoder on the rotated data to generate a filtered data. The value of Q may be 1, 2, 3 etc. The precoding of the data and the pilots may be performed separately, in one embodiment. The DFT spread unit 203 and subcarrier mapping unit 302 performs a DFT spreading and subcarrier mapping is performed on the filtered data to generate a mapped filtered data. The IFFT module 303 performs an inverse transform of the mapped filtered data to generate a time domain signal. The output module (not shown in figure) performs at least one of addition of cyclic prefix, cyclic suffix, windowing, windowing with overlap and adding operation (WOLA) and filtering of the time domain signal to generate output sequence. The output sequence may be fed to the DAC 304 to generate an analog waveform, which is transmitted to a destination.

Figure 8A:
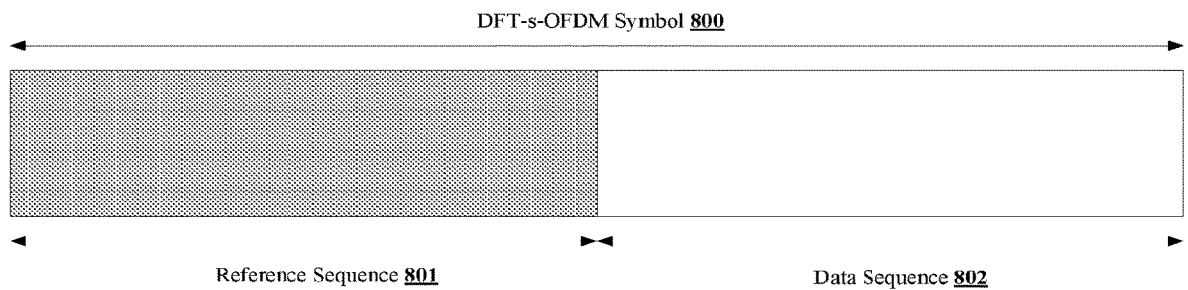
FIG. 8A shows a DFT-s-OFDM symbol frame illustrating a first type of multiplexing data and reference sequence in a single slot of the DFT-s-OFDM symbol, in accordance with some embodiments of the present disclosure.

FIG. 8A shows a DFT-s-OFDM 800 symbol frame illustrating a first type of multiplexing data and reference sequence in a single slot of the DFT-s-OFDM symbol, in accordance with some embodiments of the present disclosure.

Figure 8B:
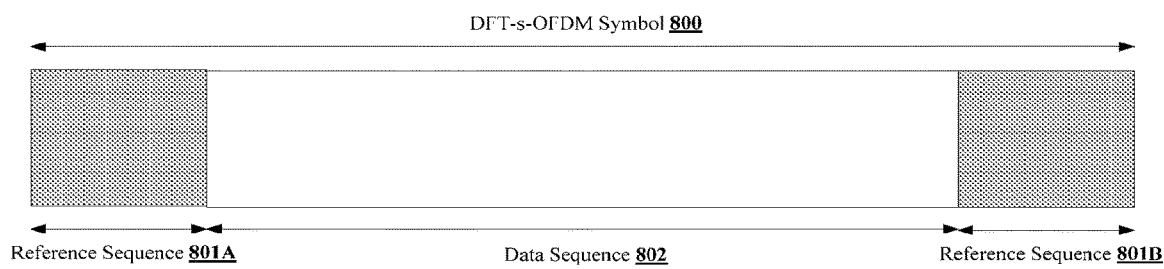
FIG. 8B shows a DFT-s-OFDM symbol frame illustrating a second type of multiplexing data and reference sequence in a single slot of the DFT-s-OFDM symbol, in accordance with some embodiments of the present disclosure.

FIG. 8B shows a DFT-s-OFDM symbol 900 where the reference sequence is added at the beginning (head) and the end (tail) of the DFT-s-OFDM symbol. In an embodiment, the reference sequence 801 may also be referred as pilot symbol or pilot sequence or pilot, in the present disclosure. In an embodiment, the reference sequence 801A at the head may be L1 pilots and the reference sequence 801B added at the tail of the symbol may be L2 pilots. The pilot symbol 801B at the end of the OFDM symbol act as memory for the pilot symbol 801A at the beginning of the OFDM symbol. Therefore, the channel may be estimated using the first L1 pilot symbols 801A. If L2 is sufficiently large, that is the value of L2 is greater than the ISI channel length, a portion of pilot symbols 801B at the end of the DFT-s-OFDM symbol may also be used for channel estimation. The total pilot overhead is (L1+L2)/L where L is the total symbol length (sum of pilot and data symbols). For example, let total number of modulation symbols M=12, and if the channel delay spread is low, then the effective ISI channel length is one of one and two. Also, assuming effective channel length is equal to 2, selecting L1=1 and L2=1 allows the first pilot symbol 801A to be used for channel estimation whereas the last pilot symbol 801B acts as memory for the first pilot symbols. By assuming the effective channel length is equal to 1, both pilots can be used for channel estimation.

In an embodiment, when the DFT-s-OFDM symbol uses one of frequency domain pulse shaping and time domain precoding, a modulator introduces an additional ISI. For example, let us assume that the precoding filter 601 is of type p(D)=1+D, which results in a two-tap channel. For the case of M=12, if the propagation channel is ISI free i.e. single tap filter, the ISI introduced by the precoding filter 501 increases the effective channel length. For this case, using L1=2, and L2=1, the pilot symbol 801A that is located at the beginning of the OFDM symbol can be used for channel estimation.

In one embodiment, a data sequence 802 and reference sequence 801 are time multiplexed in one OFDM symbol for transmission, a higher pilot overhead can be used to allow reliable control decoding. For the case of M=12, L1=3 and L2=1 can be used, with p(D)=1 or P(D)=1+D. In this case, the total pilot overhead is ⅓. For a pilot overhead of ½, 6 pilot symbols can be used with L1=3 and L2=3.

In an embodiment, the location of the pilots may be at beginning (head), end (tail) or middle or distributed throughout OFDM symbol in chunks of equal or unequal size. In one embodiment, the chunk size may be 1, 2 or 4 or more. The placement and density of pilots is optimized such that channel phase or magnitude tacking is done with good accuracy.

In one embodiment of the present disclosure, the time multiplexing pilot 801 and data sequence 802 in one block is performed and transmitted as one OFDM symbol, for high Doppler scenarios (high speed mobiles). For example, to track channel variations caused by high speed mobiles (e.g. high-speed trains), multiple OFDM symbols may be used for channel estimation where pilots 801 are present in every OFDM symbol.

In an embodiment, the pilots 801 may be multiplexed with the data sequence at multiple locations in the same OFDM symbol.

Figure 8C:
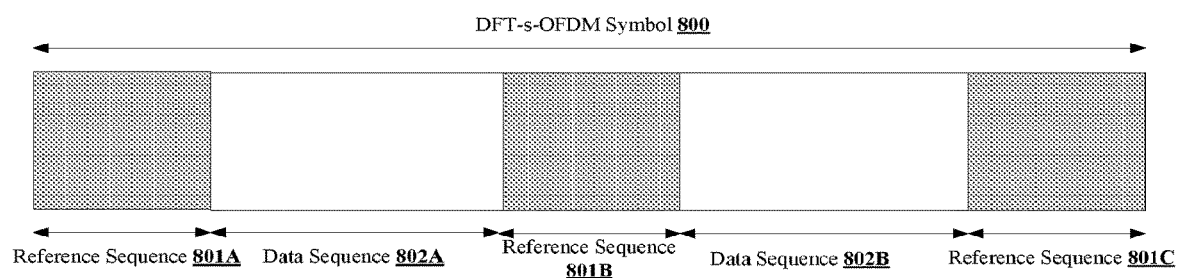
FIG. 8C shows a DFT-s-OFDM symbol frame illustrating a third type of multiplexing data and reference sequence in a single slot of the DFT-s-OFDM symbol, in accordance with some embodiments of the present disclosure.

FIG. 8C shows multiplexing of data sequence 802 and pilots 801 at the head, tail and a central portion of the OFDM symbol. In an embodiment, the data sequence 802 is at least one of a message bit and a control bit.

In an embodiment reference sequence 801A, 801B and 801C are modulated using at least one of a pi/2 Binary Phase Shift Keying (BPSK) and Zadoff-Chu sequence, and the data sequence is modulated using one of pi/2 Binary Phase Shift Keying (BPSK), Quadrature Phase Shift Keying (QPSK), and Quadrature Amplitude Modulation (QAM). The combined multiplexed signal achieves low PAPR.

In an embodiment, the transmitter 200 performs multi-user multiplexing of a plurality of data sequence 802, also referred as blocks of data and blocks of pilots. The data sequence 802 may also include control information. Also, the transmitter 200 performs constellation rotation on the multiplexed data, and pre-codes the rotated data using a q-tap filter. The value of q may be 1, 2 3 etc. In one embodiment where BPSK is used as constellation, the rotation value may be 90 degrees between successive modulated data sequence. In another embodiment that uses QPSK for modulated data rotation, value may be 45 degrees between successive data symbols. In one embodiment, a two-tap filter with equal values i.e., 1+D (D-being one-unit delay) may be used. In another embodiment q=1 implies a filter is not used. Further, the transmitter 100 transforms the filtered data using DFT and may use localized or distributed subcarrier mapping of the transformed data, where distributed mapping may span the entire available bandwidth, to generate mapped data. Thereafter, the transmitter 200 performs one of IFFT and inverse DFT on the mapped data. Furthermore, the transmitter 200 performs at least one of addition of cyclic prefix, cyclic suffix, windowing, windowing with overlap and adding operation (WOLA) and filtering of the time domain signal to generate output sequence. Next the output sequence is fed to the digital to analog converter to generate analog waveform.

In an embodiment, the references sequence 801A or 801B, and 801C, may be one of orthogonal and quasi-orthogonal codes. In one embodiment, the reference sequence 801A or 801B, and 801C, may be a BPSK sequence. The BPSK codes may be Walsh, m-sequence, Kasami sequence or gold sequence. These sequences may be used for reference sequence or as spreading codes for control. In another embodiment, the reference sequence 801A or 801B, and 801C, may be a Zadoff-Chu (ZC) sequence. The codes allocated for different users may be function of base station or cell or sector ID. The reference sequence 801A or 801B, and 801C, notation is given below in equation (1):

$$x(n)=\exp(-jun(n+1+2q)/Nz) \quad (1)$$

where Nz is the length of the sequence, n=0, 1, . . . , Nz−1, j is square root of −1, u=0, 1, . . . , Nz−1, q is an integer. For q=0, we get the Chu sequence. In an embodiment, we may also denote equation 1 as a base sequence given below in equation (2).

$$x(n)=\exp(-jn(n+1)/Nz) \quad (2)$$

Figure 8D:
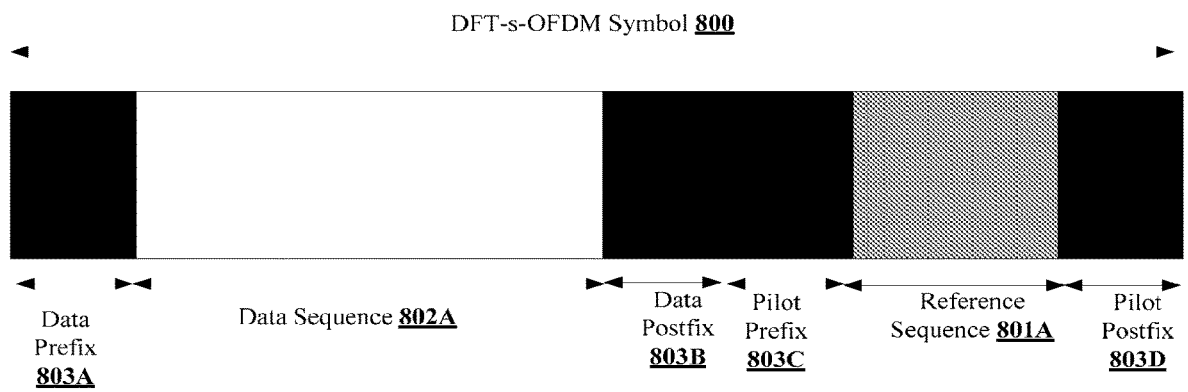
FIG. 8D shows representation of a sequence at least one of RS and data/control using a cyclic prefix/post-fix, in accordance with another embodiment of the present disclosure.

FIG. 8D shows representation of a sequence at least one of RS and data/control uses cyclic prefix/post-fix, in accordance with another embodiment of the present disclosure. The length of RS and data/control may be unequal, and the length of cyclic prefix/post fix used by RS and data/control may be unequal. Furthermore, data/control may use pi/2 BPSK modulation and are pre-coded using a precoder such as 1+D precoder over the duration of the data/control whereas the RS may use ZC sequences with low PAPR. In this case, pi/2 constellation rotation and 1+D precoding may be applied only on the data/control portion independent of the RS sequence. Furthermore, addition of prefix/post fix on data/control and possible 1+D precoding over the duration of data/control avoids the ISI between data/control and RS at the boundaries. In another embodiment, pi/2 rotation is performed for all the data/control and RS sequence continuously over the duration of the OFDM symbol. In another embodiment, pi/2 rotation and precoding such as 1+D precoding is performed for all the data/control and RS sequence continuously over the duration of the OFDM symbol. The inclusion of cyclic prefix or suffix for data/control or RS is useful for low-complexity equalization at the receiver.

Figure 9:
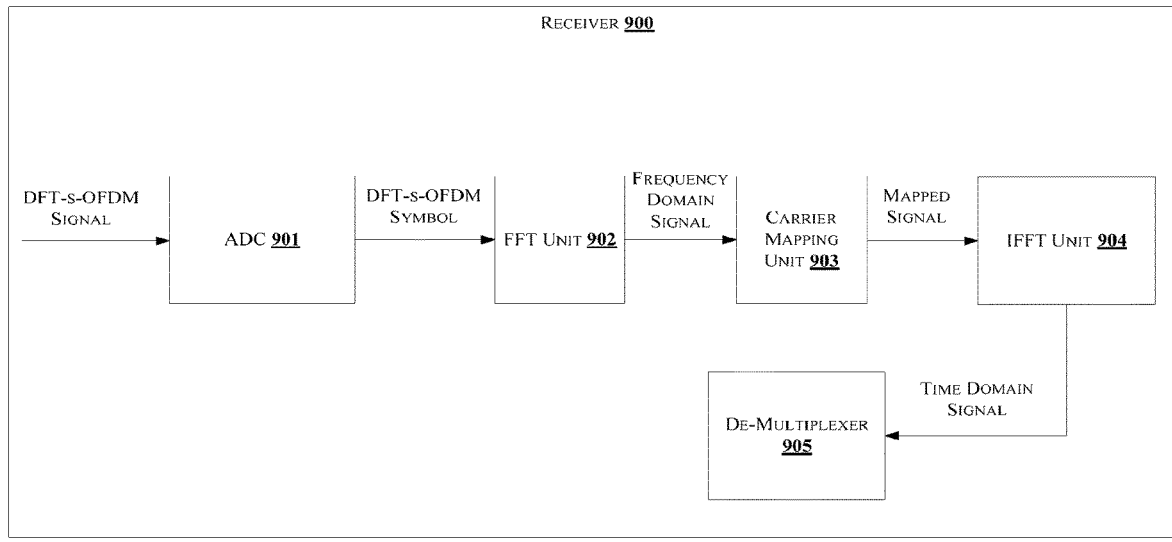
FIG. 9 shows an exemplary block diagram of a receiver for receiving a DFT-s-OFDM signal, in accordance with some embodiments of the present disclosure.

FIG. 9 shows an exemplary block diagram illustration of a receiver 900. The receiver 900 comprises an Analog to Digital Converter (ADC) 901, a Fast Fourier Transform (FFT) Unit 902, a carrier de-mapping unit 903, a IFFT unit 904 and a de-multiplexer 905. The ADC 901 receives the DFT-s-OFDM analog signals from the transmitter 100 over a channel. The ADC 901 converts the analog signal into corresponding digital signals. The output of the ADC 901 is a digital DFT-s-OFDM signal or a DFT-s-OFDM symbol. Further, the DFT-s-OFDM symbol is provided to the FFT unit 902. The FFT unit 902 may be DSP. The FFT unit 902 performs FFT on the DFT-s-OFDM symbol to convert time domain signal to frequency domain signal. Thereafter, the carrier de-mapping unit 903 de-maps the multiplexed sequence from the sub-carriers of the OFDM symbol. The sub-carrier de-mapping in the receiver 909 helps in choosing a type of demodulation required for corresponding sub-carriers. Then the IFFT unit 904 performs IFFT on the mapped signal to generate a time domain signal. Furthermore, the de-multiplexer 905 demultiplexes the time domain mapped OFDM symbol to isolate the reference sequence 801 or 801-1, 801-2 etc, and the data sequence 801A or 801B, and 801C. The reference sequence 801A or 801B, and 801C, and the data sequence 802A or 802B are further provided to a post-processor (not shown in figure). The reference sequence 801A or 801B, and 801C are used to estimate the channel properties. The receiver 900 may further comprise a constellation de-rotation unit for restoring the rotated constellation points.

In an embodiment, a frequency domain channel estimator estimates the frequency domain signal that comprises of time multiplexed pilots and data. A frequency domain processing is applied to retrieve the pilots of interest and channel estimation yields required frequency domain channel that is used for equalization of data. The frequency domain channel may be used for equalization of data followed by IDFT of equalized data and followed by demodulation or soft demodulation.

Figure 10A:
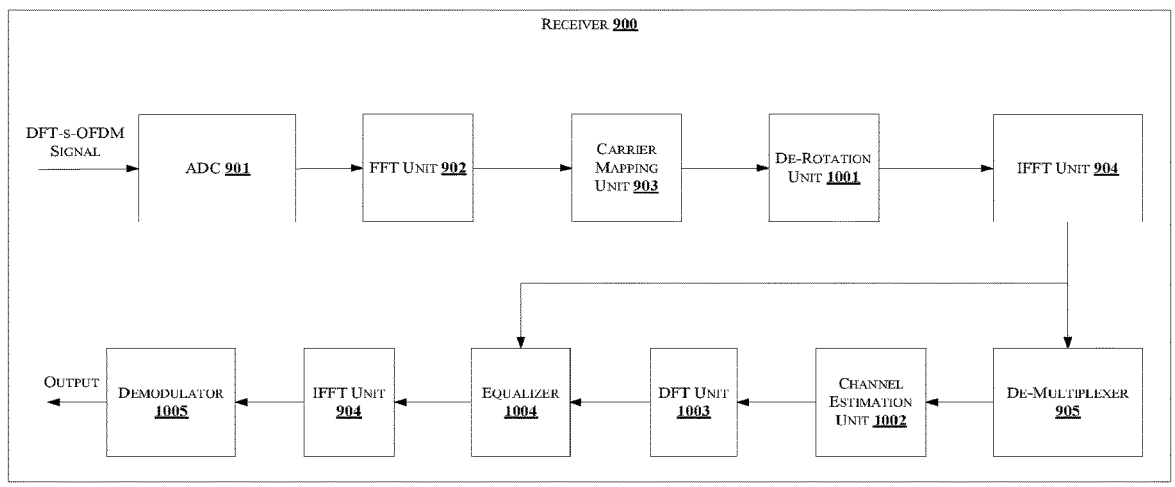
FIG. 10A shows a block diagram illustration of a receiver, in accordance with some embodiments of the present disclosure.

FIG. 10A shows a block diagram illustration of a receiver for receiving a waveform, in accordance with an embodiment of the present disclosure.

As shown in FIG. 10A, the receiver 900 includes a processor and a memory (not shown in Figure). The memory may be communicatively coupled to the processor. The processor may be configured to perform one or more functions of the receiver 900 for receiving a waveform. In one implementation, the receiver 900 may comprise modules for performing various operations in accordance with the embodiments of the present disclosure. The receiver 900 is configured to detect the received waveform.

The modules of the receiver 900 may include the ADC 901, FFT unit 902, the carrier mapping unit 903, optional de-rotation unit 1101, the IFFT unit 904, de-multiplexer (de-mux) unit 905, a channel estimation unit 1002, a Discrete Fourier Transform (DFT) unit 1003 1118, an equalizer 1004, and a demodulator 1005.

The FFT unit 902, is also referred as Discrete Fourier Transform (DFT) module, to transform the input data. The carrier mapping unit 903 or subcarrier de-mapping module performs the de-mapping of the transformed data, to collect allocated subcarriers and generate de-mapped data. Also, the receiver 900 includes the optional de-rotation unit 1001 to perform constellation de-rotation on the de-mapped data to obtain de-rotated data. After performing the constellation de-rotation, the IFFT unit 904 converts one of the de-mapped data and the de-rotated data to time domain to collect the received time domain pilot samples, which are of interest. The de-mux unit 905 performs demultiplexing of the time domain pilot's samples. The channel estimation unit 1002 performs channel estimation in time domain followed by conversion of time domain samples associated with channel to frequency domain using a DFT/FFT unit 1003. The equalizer 1004 performs equalization of frequency domain channel followed by IDFT of equalized data using IFFT 904 and followed by demodulation or soft demodulation using demodulator 1005 to obtain an output.

Figure 10B:
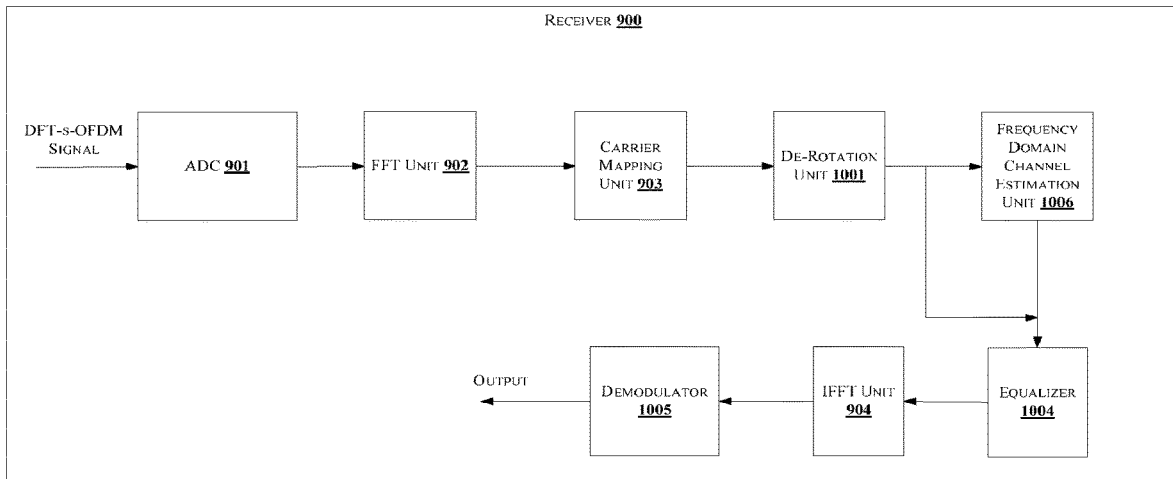
FIG. 10B shows a block diagram illustration of a receiver, in accordance with another embodiment of the present disclosure.

FIG. 10B shows a block diagram illustration of a receiver, in accordance with another embodiment of the present disclosure. As shown in FIG. 11B, the receiver performs estimation in alternate to the time domain channel estimation, i.e. the channel estimation is performed in frequency domain.

The subcarrier de-mapping module 903 performs the de-mapping of the transformed data, to collect allocated subcarriers and generate de-mapped data. Also, the receiver 900 includes the optional de-rotation module 1101 to perform constellation de-rotation on the de-mapped data to obtain de-rotated data. The frequency domain channel estimator 1006 estimates the frequency domain signal that comprises of time multiplexed pilots and data from the de-mapped data. The frequency domain processing is applied to retrieve the pilots of interest and channel estimation yields required frequency domain channel that is used for equalization of data. The equalizer 1004 performs equalization of frequency domain channel followed by IDFT of equalized data using IFFT 1004 and followed by demodulation or soft demodulation using demodulator 1005 to obtain an output.

FIG. 10C shows a block diagram illustration of a receiver, in accordance with another embodiment of the present disclosure.

Figure 11:
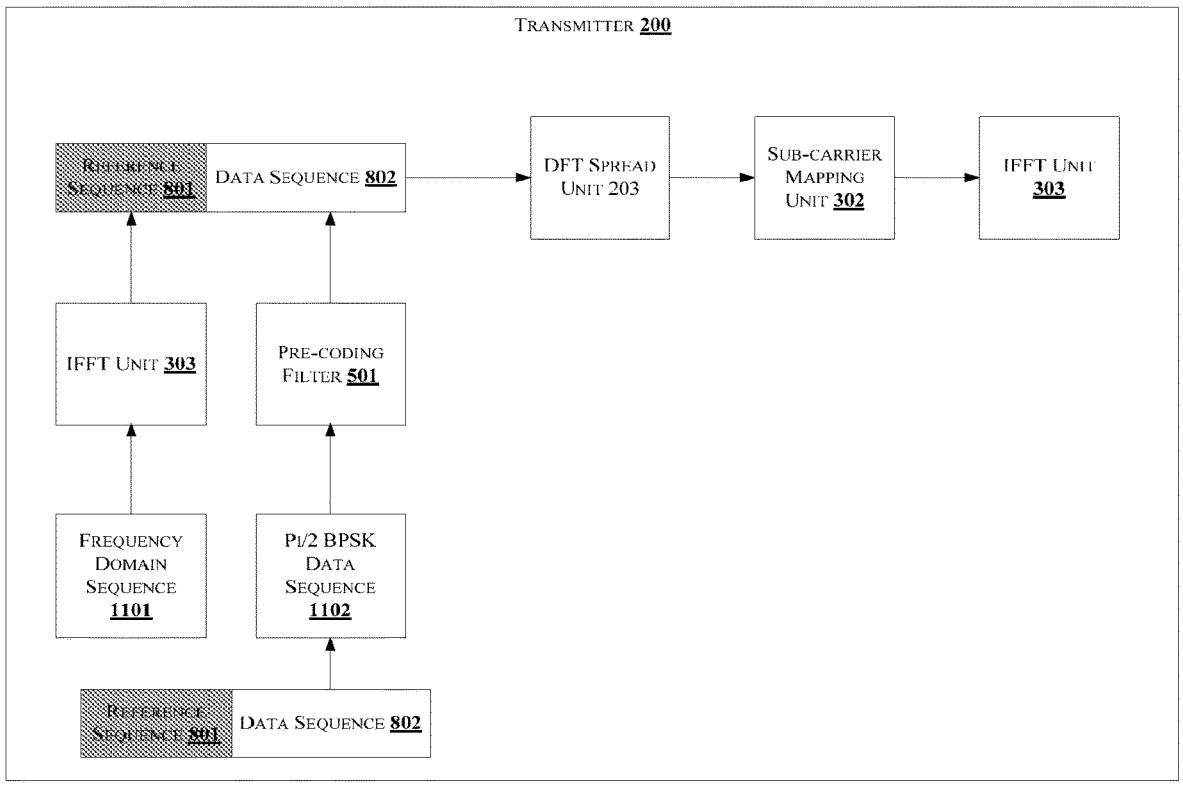
FIG. 11 shows a block diagram illustrating of a transmitter for transmitting a waveform by multiplexing data and pilots, in accordance with some embodiments of the present disclosure.

FIG. 11 shows a block diagram illustrating of a transmitter for transmitting a waveform by multiplexing data and pilots, in accordance with some embodiments of the present disclosure. The transmitter is also referred as a communication system or transmitter system.

As shown FIG. 11, the transmitter 200 includes a processor and a memory (not shown in Figure). The memory may be communicatively coupled to the processor. The processor may be configured to perform one or more functions of the transmitter 200 for generating and transmitting data or waveform. In one implementation, the transmitter 200 may comprise modules for performing various operations in accordance with the embodiments of the present disclosure. The transmitter 200 is configured to multiplex data and pilot, wherein the data may be control information. The transmitter 1300 includes at least one transceiver (not shown in Figure) to perform receiving an input data from a transmitter, and transmitting a generated waveform to a destination.

The modules of the transmitter 200 include a Discrete Fourier Transform (DFT) spread unit 203, a subcarrier mapping unit 302, an IFFT unit 303, and a precoding filter 501. The DFT spread unit 203 is also referred as FFT module. The IFFT unit 303 is also referred as inverse fast Fourier Transform (FFT) module.

The transmitter 200 is configured such that the multiplexer 202 multiplexes that a reference signal (RS) and data/control in a single OFDM symbol. The data/control may be generated using a base pi/2 BPSK sequence 1102 and at least one tail modulation data 802 is appended to the base BPSK sequence. The at least one tail modulation data 802 may be a known BPSK sequence or derived as the last 'v1' points of the base BPSK sequence. In an exemplary embodiment, the length 'v1' is unity. The tail appended BPSK data/control is further goes through pi/2 rotation 1102, the precoder 501 of type 1+D or 1 before insertion into single OFDM symbol block. An optional cyclic prefix may further be added to the data/control. The OFDM symbol block goes through the DFT module 203 which is M-point DFT for DFT spreading and frequency domain windowing, localized or distributed subcarrier mapping.

The subcarrier mapping module 302 performs subcarrier mapping on the DFT multiplexed data to generate mapped DFT multiplexed data. The IFFT 303 performs an inverse transform of the mapped DFT multiplexed data to generate a time domain signal. An output module (not shown in the figure) performs at least one of addition of cyclic prefix, cyclic suffix, windowing, windowing with overlap and adding operation (WOLA) and filtering of the time domain signal to generate output sequence. The output sequence may be fed to a digital to analog converter (DAC) (not shown in Figure) to generate an analog waveform, which is transmitted to a destination.

Figure 12:
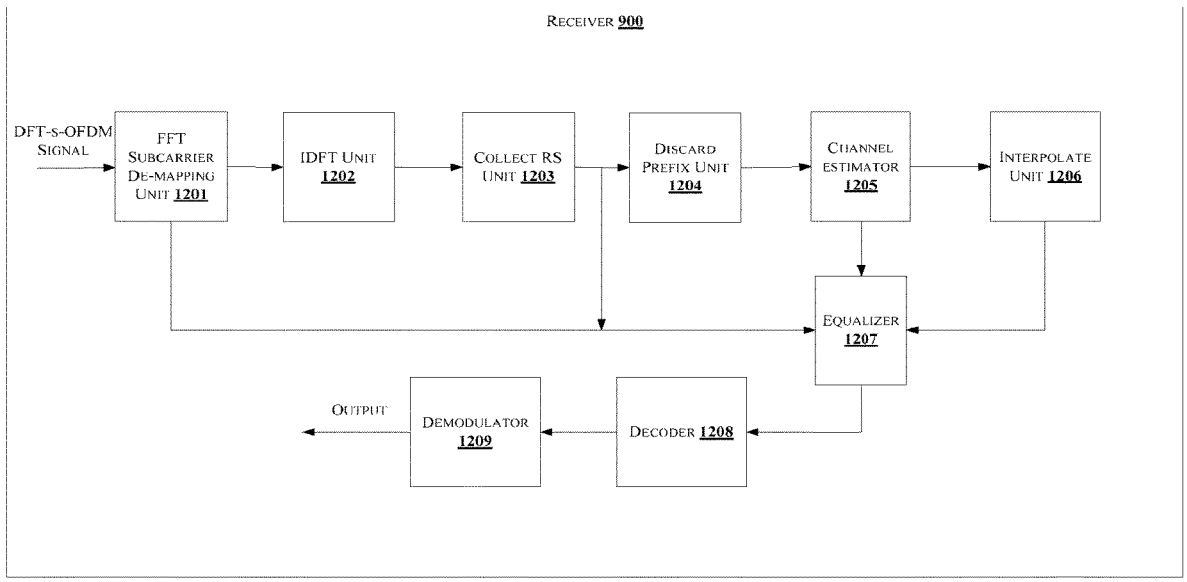
FIG. 12 shows a block diagram of receiver for multiplexed RS and Data/control, in accordance with some embodiments of the present disclosure.

FIG. 12 shows a block diagram of receiver for multiplexed RS and Data/control, in accordance with some embodiments of the present disclosure. The receiver 900 performs operations such as, but not limited to RF to baseband conversion, ADC, sampling, CP removal not shown in the FIG. 12.

The receiver 1400 may include fast Fourier Transform (FFT) subcarrier de-map unit 1201, an inverse Discrete Fourier Transform (IDFT) unit 1202, collect RS unit 1203, discard prefix unit 1204, channel estimator comprising channel estimation module 1205 and interpolate unit 1206, equalizer 1207, an optional decoder 1208 and a demodulator 1209.

As shown in FIG. 12, the receiver 900 is configured to perform fast Fourier transform (FFT) and subcarrier de-mapping using the FFT subcarrier de-map unit 1201, followed by inverse M-point DFT using IDFT 1202 to generate inverse transformed data. The collect RS unit 1203 obtains or collects RS and data/control from the inverse transformed data. The discard prefix unit 1204 discard the prefix from the collected data.

The channel estimator 1207 is configured to estimate channel using the discarded data complete or samples of the received RS. This may be performed by a time domain channel estimation using methods such as least squares, MMSE, correlation. Also, the channel estimator 1205 may use frequency domain channel estimation, which uses L-point DFT (L-being base RS length), division of each frequency domain sample by the frequency domain RS sample to obtain equalized RS, possible frequency domain filtering of equalized RS (filtering may include interpolation to reduce noise/interference), L-point IDFT to obtain received time domain impulse response, possible time domain windowing on the received time domain impulse response to reduce noise/interference, M-point DFT to obtain interpolated channel estimate.

In an embodiment, when the RS does not include a prefix, the time/frequency domain channel estimation methods may be used. The equalizer 1207 may be configured in one of an equalizer which uses time domain processing and equalizes the data/control samples and frequency domain input, applied with frequency domain equalization to generated equalized samples of data/control. The equalized data/control is fed to a de-coder 1208 which may perform pi/2 constellation de-rotation. Also, the de-coding may perform steps to eliminate the effects of precoding such as 1+D decoding. These steps may involve collection of real and imaginary parts and combing of the real and imaginary parts after applying a shift to real/imaginary part and scaling. The demodulator 1209 performs demodulation operation on the decoded data to obtain an output.

Figure 13:
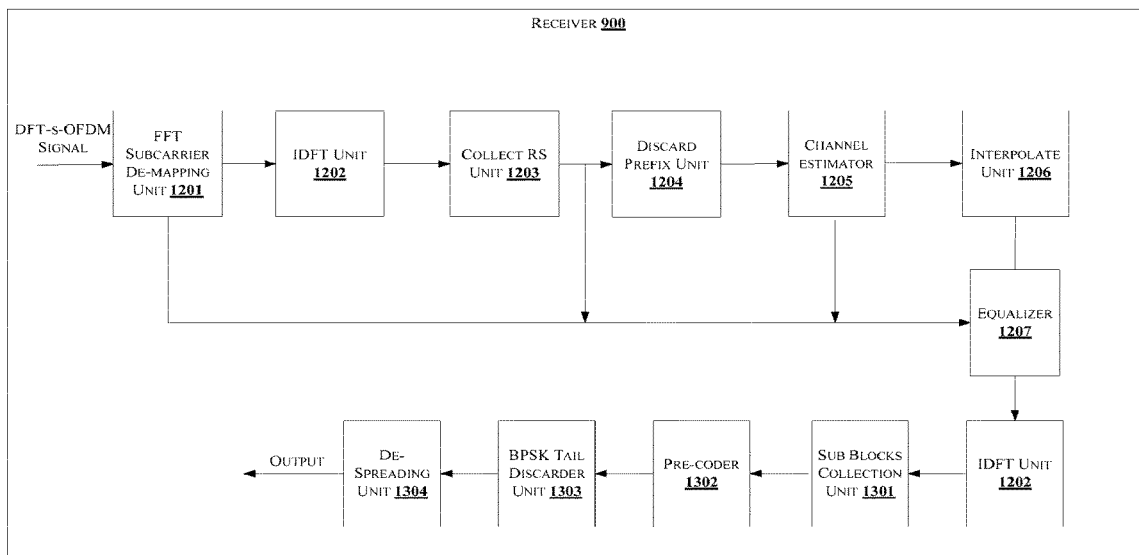
FIG. 13 shows an illustration of a receiver, in accordance with another embodiment of the present disclosure.

FIG. 13 shows an illustration of a receiver, in accordance with another embodiment of the present disclosure.

The receiver 900 may include fast Fourier Transform (FFT) subcarrier de-map module 1201, an inverse Discrete Fourier Transform (IDFT) unit 1202, collect RS unit 1203, discard prefix unit 1204, channel estimator comprising channel estimation unit 1205 and interpolate unit 1206, widely linear (WL) equalizer 1207, collect sub blocks unit 1301, precoder 1302, discard BPSK tail unit 1303, and dispreading unit 1304.

As shown in FIG. 13, the receiver 900 is configured to perform fast Fourier transform (FFT) and subcarrier de-mapping using the FFT subcarrier de-map unit 1201, followed by inverse M-point DFT using IDFT unit 1202 to generate inverse transformed data. The collect RS unit 1203 obtains or collects RS and data/control from the inverse transformed data the discard prefix unit 1204 discard the prefix from the collected data.

The channel estimator 1205 is configured to estimate channel using the discarded data complete or samples of the received RS. This may be performed by a time domain channel estimation using methods such as least squares, MMSE, correlation. Also, the channel estimator unit 1205 may use frequency domain channel estimation, which uses L-point DFT (L-being base RS length), division of each frequency domain sample by the frequency domain RS sample to obtain equalized RS, possible frequency domain filtering of equalized RS (filtering may include interpolation to reduce noise/interference), L-point IDFT to obtain received time domain impulse response, possible time domain windowing on the received time domain impulse response to reduce noise/interference, M-point DFT to obtain interpolated channel estimate.

The widely linear (WL) equalizer 1207 equalizes the data/control samples and frequency domain input, applied with frequency domain equalization to generated equalized samples of data/control. The IDFT unit 1202 generates a time domain signal from the frequency domain equalized samples. The collect sub-block unit 1301 collects the sub blocks from the frequency domain equalized samples, the precoder 1302 pre-codes the collected sub blocks, the BPSK tail discard unit 1303 discard BPSK tails from the pre-coded data before the data/control is further processed using an optional de-spreading unit 1304. The receiver 900 is useful in case where transmitter does not include prefix, i.e. CP for data/control sub-blocks and BPSK includes precoding of type 1+D that creates ISI at boundary between data/control sub-blocks and RS.

In one embodiment, when the transmitter comprises a pi/2 BPSK with 1+D decoding, the channel estimator may operate in one of two implementations.

In a first implementation, the single/multi-user channel estimator estimates the composite channel impulse response including the ISI cased by 1+D precoder. The equalizer equalizes the signal using conventional or widely linear Minimum Mean Square Estimation (MMSE) equalizers where the constellation de-rotated signal and its complex conjugate and frequency reversed copies are jointly filtered for equalization.

In the second case, where transmitter uses 1+D precoder, the channel estimator treats the reference sequence as equivalent QPSK symbols (pi/2 BPSK RS with 1+D precoding results in QPSK reference sequence data) and estimates the propagation channel only. Then equalizer treats the pi/2 BPSK modulated data and reference sequence as effective QPSK symbols and uses an equalizer to produce a QPSK decision variable at the equalizer output. Further, the receiver uses 1+D decoding to recover BPSK modulated data/control through possible dispreading operation.

In one embodiment, when reference sequence includes prefix and post-fix, the reference sequence exhibits circular symmetry over the duration of prefix. This property is used for efficient channel estimation. The receiver 900 may collect reference sequence samples including prefix, post-fix, discard the first 'v' samples, where v is less than or equal to length of prefix and collect a total of 'L' RS samples. A DFT of size 'L' is taken on the reference sequence and channel estimation is done in frequency domain. Further the 'L' channel samples in frequency domain may be interpolated to M-samples. One possible approach uses a L-point IDFT followed by M-point DFT or some other technique. The value of L and v may be chosen arbitrarily based on expected delay spread. In an embodiment, the value of L is chosen such that it is suitable for fast DFT implementation. In one embodiment, the value of L is an integer multiple of 2. In another embodiment, the value of L may be represented as $2^p 3^q$ where p and q are integers.

In an embodiment, for reference sequence design, BPSK modulated reference signals with orthogonal or quasi-orthogonal property may be used for pilot code multiplexing. The reference sequence sequences preferably exhibit circular symmetry over a portion. In one embodiment, a base length 'L' set of sequences may be constructed. For each sequence the last v symbols of the reference sequence are appended in the beginning to obtain 'L+v' length reference sequence. Also, the last v symbols are the post-fix and the first v symbols are the prefix. The value of v may be greater than or equal to zero. The exact value depends on the expected delay spread.

In one embodiment, ZC sequences may be used as reference sequence symbols and data sequence may be modulated using pi/2 BPSK. In one embodiment, data sequence may apply 1+D precoding while reference sequence may not use 1+D precoding. The pi/2 BPSK portion of data sequence has low PAPR and the ZC modulated reference sequence signal also has low PAPR. In another embodiment, the data sequence may use QPSK or high order modulation and reference sequence may use ZC sequences. In yet another embodiment, data sequence and reference sequence use pi/2 BPSK without 1+D type precoding.

For the case when data sequence is pi/2 BPSK with 1+D precoding and reference sequence is ZC sequence, at the boundary between reference sequence and data sequences, 1+D decoder creates ISI (inter-symbol-interference) between data and ZC sequence. In one embodiment, a null symbol is placed before and/or after the reference sequence.

When ZC sequence is used as reference sequence, the channel estimator estimates the propagation channel only and the effects of any precoder used by the transmitter (such as 1+D precoder) is not reflected in the estimated channel. However, the receiver can use the receiver structure to remove the effects of 1+D precoding through post-processing of equalized data. Other receiver techniques such as WL (widely linear) MMSE may also be used without post-processing. If the data sequence portion uses QPSK or other modulation, and ZC sequence is used as reference sequence, then the receiver 900 may use the structure.

In an embodiment, the present disclosure discloses a method and a communication system where data and pilots can be transmitted in a single OFDM symbol. Thus, transmission efficiency is more, and pilots can be effectively used to estimate channel.

Figure 14:
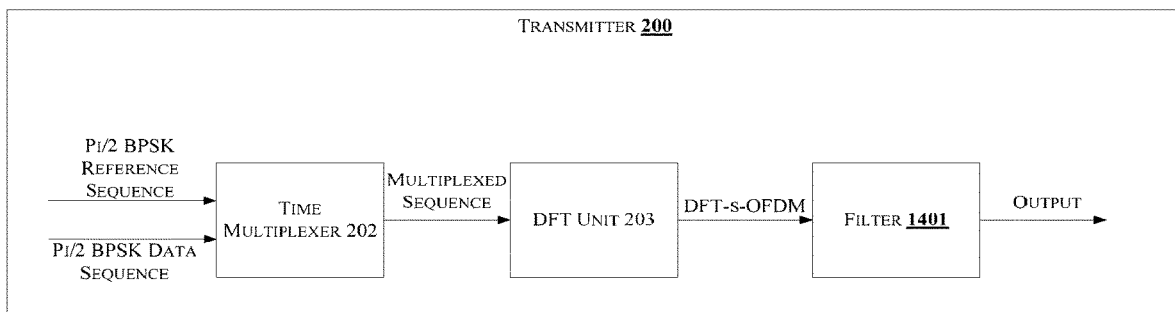
FIG. 14 shows an illustration of a transmitter where the RS and data/control are pi/2 BPSK modulated sequences, in accordance with some embodiments of the present disclosure.

FIG. 14 shows an illustration of a transmitter where the RS and data/control are pi/2 BPSK modulated sequences, in accordance with some embodiments of the present disclosure. When the reference sequence and the data sequence are modulated using pi/2 BPSK scheme, the transmitter 200 may comprise a filter 1401 to filter the time multiplexed OFDM symbol. FIG. 14 shows filtering of the time multiplexed OFDM symbol.

Figure 15:
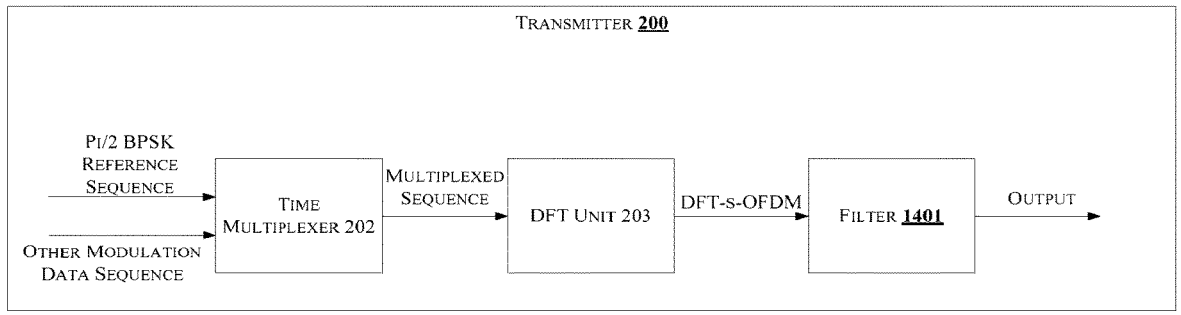
FIG. 15 shows an illustration of a transmitter where the RS is pi/2 BPSK modulated and the data/control may be any other modulated sequence, in accordance with some embodiments of the present disclosure.

FIG. 15 shows an illustration of a transmitter where the RS is pi/2 BPSK modulated and the data/control may be any other modulated sequence, in accordance with some embodiments of the present disclosure. When the reference sequence is modulated using pi/2 BPSK scheme and the data sequence are modulated using any other scheme, like QAM, 16-bit QAM, 64-bit QAM, or any other modulation technique, the transmitter 200 may not filter the time multiplexed OFDM symbol.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for transmitting, comprising:
   receiving, by a transmitter, at least one data sequence and at least one pi/2 binary phase shift keying reference sequence (pi/2 BPSK-RS);
   time-multiplexing, by the transmitter, the at least one pi/2 BPSK-RS with the at least one data sequence, to generate a multiplexed sequence; and
   performing, by the transmitter, a Discrete Fourier Transform (DFT) on the multiplexed sequence, in a time domain, to generate a DFT-spread-Orthogonal Frequency Division Multiplexing (DFT-s-OFDM) symbol, in a frequency domain.

2. The method of claim 1, wherein the at least one data sequence is one of a pi/2 BPSK sequence, a BPSK sequence, a Quadrature Phase Shift Keying (QPSK) sequence, a 16 Quadrature Amplitude Modulation (QAM) sequence, and a 64 Quadrature Amplitude Modulation (QAM) sequence.

3. The method of claim 1, wherein the at least one data sequence comprises at least one of a message bit and a control bit.

4. The method of claim 1, wherein the at least one data sequence is filtered.

5. The method of claim 1, wherein the at least one data sequence is filtered using a two-tap filter, and wherein the two-tap filter comprises equal magnitudes for the two taps with a unit delay between the two taps.

6. The method of claim 1, wherein the at least one data sequence is filtered using a three-tap filter having three consecutive taps, and wherein a first tap and a third tap of the three-tap filter have an equal magnitude.

7. The method of claim 1, wherein the at least one data sequence is unfiltered sequence.

8. The method of claim 1, wherein the at least one pi/2 BPSK-RS is filtered.

9. The method of claim 1, wherein the at least one pi/2 BPSK-RS is filtered using a two-tap filter, the two-tap filter comprises equal magnitudes for the two taps with a unit delay between the two taps.

10. The method of claim 1, wherein the at least one pi/2 BPSK-RS is filtered using a three-tap filter having three consecutive taps, and wherein a first tap and a third tap of the three-tap filter have an equal magnitude.

11. The method of claim 1, wherein the at least one pi/2 BPSK-RS is an unfiltered sequence.

12. The method of claim 1, wherein the at least one pi/2 BPSK-RS comprises at least one of a prefix and a postfix.

13. The method of claim 1, wherein the at least one pi/2 BPSK-RS is located in at least one of a head and a tail of the DFT-s-OFDM symbol.

14. The method of claim 1, comprising:
   mapping the DFT-s-OFDM symbol to one or more subcarriers to generate a mapped symbol; and
   performing an Inverse Fast Fourier Transform (IFFT) on the mapped symbol to produce a time domain DFT-s-OFDM symbol.

15. A system, comprising:
   a transmitter configured to:
      receive at least one data sequence and at least one pi/2 binary phase shift keying reference sequence (pi/2 BPSK-RS);
      time-multiplex the at least one pi/2 BPSK-RS with the at least one data sequence, to generate a multiplexed sequence; and
      perform a Discrete Fourier Transform (DFT) on the multiplexed sequence in a time domain, to generate a DFT-spread-Orthogonal Frequency Division Multiplexing (DFT-s-OFDM) symbol, in a frequency domain.

16. The system of claim 15, wherein the at least one data sequence is one of a pi/2 BPSK sequence, a BPSK sequence, a Quadrature Phase Shift Keying (QPSK) sequence, a 16 Quadrature Amplitude Modulation (QAM) sequence, and a 64 Quadrature Amplitude Modulation (QAM) sequence.

17. The system of claim 15, wherein the at least one data sequence comprises at least one of a message bit and a control bit.

18. The system of claim 15, wherein the at least one data sequence is filtered.

19. The system of claim 15, wherein the at least one data sequence is filtered using a two-tap filter, and wherein the two-tap filter comprises equal magnitudes for the two taps with a unit delay between the two taps.

20. The system of claim 15, wherein the at least one data sequence is filtered using a three-tap filter having three consecutive taps, and wherein a first tap and a third tap of the three-tap filter have an equal magnitude.

21. The system of claim 15, wherein the at least one data sequence is unfiltered sequence.

22. The system of claim 15, wherein the at least one pi/2 BPSK-RS is filtered.

23. The system of claim 15, wherein the at least one pi/2 BPSK-RS is filtered using a two-tap filter, the two-tap filter comprises equal magnitudes for the two taps with a unit delay between the two taps.

24. The system of claim 15, wherein the at least one pi/2 BPSK-RS is filtered using a three-tap filter having three consecutive taps, and wherein a first tap and a third tap of the three-tap filter have an equal magnitude.

25. The system of claim 15, wherein the at least one pi/2 BPSK-RS is an unfiltered sequence.

26. The system of claim 15, wherein the at least one pi/2 BPSK-RS comprises at least one of a prefix and a postfix.

27. The system of claim 15, wherein the at least one pi/2 BPSK-RS is located in at least one of a head and a tail of the DFT-s-OFDM symbol.

28. The system of claim 15, wherein the transmitter is configured to:
    map the DFT-s-OFDM symbol to one or more sub-carriers to generate a mapped symbol; and
    perform an Inverse Fast Fourier Transform (IFFT) on the mapped symbol to produce a time domain DFT-s-OFDM symbol.

29. The method of claim 1, wherein the method comprises:
    performing a time domain pulse shaping on the DFT-s-OFDM symbol to generate a pulse shaped DFT-s-OFDM symbol.

30. The method of claim 1, wherein the method comprises:
    performing a frequency domain pulse shaping on the DFT-s-OFDM symbol to generate a pulse shaped DFT-s-OFDM symbol.

31. The system of claim 15, wherein the transmitter is operable to:
    perform a time domain pulse shaping on the DFT-s-OFDM symbol to generate a pulse shaped DFT-s-OFDM symbol.

32. The system of claim 15, wherein the transmitter is operable to:
    perform a frequency domain pulse shaping on the DFT-s-OFDM symbol to generate a pulse shaped DFT-s-OFDM symbol.

33. The method of claim 14, wherein the method comprises:
    performing a time domain pulse shaping on the time domain DFT-s-OFDM symbol.

34. The method of claim 14, wherein the method comprises:
    performing a frequency domain pulse shaping on the mapped symbol.

35. The system of claim 28, wherein the transmitter is operable to:
    perform a time domain pulse shaping on the time domain DFT-s-OFDM symbol.

36. The system of claim 28, wherein the transmitter is operable to:
    performing a frequency domain pulse shaping on the mapped symbol.

37. A method for processing a waveform in a communication network, comprising:
    generating a time domain multiplexed sequence, via an Inverse Discrete Fourier Transform (IDFT) of a frequency domain signal comprising a DFT-Spread-Orthogonal Frequency Division Multiplexing (DFT-s-OFDM) symbol; and
    de-multiplexing the time domain multiplexed sequence to generate at least one pi/2 binary phase shift keying reference sequence (pi/2 BPSK-RS) and at least one data sequence.

38. The method of claim 37, wherein the at least one data sequence is one of a pi/2 BPSK sequence, a BPSK sequence, a Quadrature Phase Shift Keying (QPSK) sequence, a 16 Quadrature Amplitude Modulation (QAM) sequence, and a 64 Quadrature Amplitude Modulation (QAM) sequence.

39. The method of claim 37, wherein the at least one data sequence comprises at least one of a message bit and a control bit.

40. The method of claim 37, wherein the at least one data sequence is filtered.

41. The method of claim 37, wherein the at least one data sequence is filtered using a two-tap filter, and wherein the two-tap filter comprises equal magnitudes for the two taps with a unit delay between the two taps.

42. The method of claim 37, wherein the at least one data sequence is filtered using a three-tap filter having three consecutive taps, and wherein a first tap and a third tap of the three-tap filter have an equal magnitude.

43. The method of claim 37, wherein the at least one data sequence is unfiltered sequence.

44. The method of claim 37, wherein the at least one pi/2 BPSK-RS is filtered.

45. The method of claim 37, wherein the at least one pi/2 BPSK-RS is filtered using a two-tap filter, the two-tap filter comprises equal magnitudes for the two taps with a unit delay between the two taps.

46. The method of claim 37, wherein the at least one pi/2 BPSK-RS is filtered using a three-tap filter having three consecutive taps, and wherein a first tap and a third tap of the three-tap filter have an equal magnitude.

47. The method of claim 37, wherein the at least one pi/2 BPSK-RS is an unfiltered sequence.

48. The method of claim 37, wherein the at least one pi/2 BPSK-RS comprises at least one of a prefix and a postfix.

49. The method of claim 37, wherein the at least one pi/2 BPSK-RS is located in at least one of a head and a tail of the DFT-s-OFDM symbol.

50. The method of claim 37, comprising:
    performing a Fast Fourier Transform (FFT) on a time domain DFT-s-OFDM symbol to generate a mapped symbol; and
    de-mapping the mapped symbol from one or more sub-carriers to generate the DFT-s-OFDM symbol.

51. A system, comprising:
    a receiver configured to:
    generate a time domain multiplexed sequence, via an Inverse Discrete Fourier Transform (IDFT) of a frequency domain signal comprising a DFT-Spread-Orthogonal Frequency Division Multiplexing (DFT-s-OFDM) symbol; and
    de-multiplex the time domain multiplexed sequence to generate at least one pi/2 binary phase shift keying reference sequence (pi/2 BPSK-RS) and at least one data sequence.

52. The system of claim 51, wherein the at least one data sequence is one of a pi/2 BPSK sequence, a BPSK sequence, a Quadrature Phase Shift Keying (QPSK) sequence, a 16

Quadrature Amplitude Modulation (QAM) sequence, and a 64 Quadrature Amplitude Modulation (QAM) sequence.

53. The system of claim 51, wherein the at least one data sequence comprises at least one of a message bit and a control bit.

54. The system of claim 51, wherein the at least one data sequence is filtered.

55. The system of claim 51, wherein the at least one data sequence is filtered using a two-tap filter, and wherein the two-tap filter comprises equal magnitudes for the two taps with a unit delay between the two taps.

56. The system of claim 51, wherein the at least one data sequence is filtered using a three-tap filter having three consecutive taps, and wherein a first tap and a third tap of the three-tap filter have an equal magnitude.

57. The system of claim 51, wherein the at least one data sequence is unfiltered sequence.

58. The system of claim 51, wherein the at least one pi/2 BPSK-RS is filtered.

59. The system of claim 51, wherein the at least one pi/2 BPSK-RS is filtered using a two-tap filter, the two-tap filter comprises equal magnitudes for the two taps with a unit delay between the two taps.

60. The system of claim 51, wherein the at least one pi/2 BPSK-RS is filtered using a three-tap filter having three consecutive taps, and wherein a first tap and a third tap of the three-tap filter have an equal magnitude.

61. The system of claim 51, wherein the at least one pi/2 BPSK-RS is an unfiltered sequence.

62. The system of claim 51, wherein the at least one pi/2 BPSK-RS comprises at least one of a prefix and a postfix.

63. The system of claim 51, wherein the at least one pi/2 BPSK-RS is located in at least one of a head and a tail of the DFT-s-OFDM symbol.

64. The system of claim 51, wherein the receiver is configured to:
perform a Fast Fourier Transform (FFT) on a time domain DFT-s-OFDM symbol to generate a mapped symbol; and
de-map the mapped symbol from one or more sub-carriers to generate the DFT-s-OFDM symbol.

65. The method of claim 37, wherein:
the one or more DFT-s-OFDM symbols are shaped by a time domain pulse shaping filter.

66. The method of claim 37, wherein:
the one or more DFT-s-OFDM symbols are shaped by a frequency domain pulse shaping filter.

67. The system of claim 51, wherein:
the one or more DFT-s-OFDM symbols are shaped by a time domain pulse shaping filter.

68. The system of claim 51, wherein:
the one or more DFT-s-OFDM symbols are shaped by a frequency domain pulse shaping filter.

69. The method of claim 50, wherein:
the one or more DFT-s-OFDM symbols are shaped by a time domain pulse shaping filter.

70. The method of claim 50, wherein:
the one or more mapped symbols are shaped by a frequency domain pulse shaping filter.

71. The system of claim 64, wherein:
the one or more DFT-s-OFDM symbols are shaped by a time domain pulse shaping filter.

72. The system of claim 64, wherein:
the one or more mapped symbols are shaped by a frequency domain pulse shaping filter.

* * * * *